United States Patent
Bruce et al.

(10) Patent No.: US 9,916,213 B1
(45) Date of Patent: Mar. 13, 2018

(54) BUS ARBITRATION WITH ROUTING AND FAILOVER MECHANISM

(71) Applicant: BiTMICRO Networks, Inc., Fremont, CA (US)

(72) Inventors: Ricardo H. Bruce, Fremont, CA (US); Cyrill Coronel Ponce, Malabon (PH); Jarmie De La Cruz Espuerta, Bacolod (PH); Marlon Basa Verdan, Paranaque (PH)

(73) Assignee: BITMICRO Networks, Inc., Fremont, CA (US)

( * ) Notice: Subject to any disclaimer, the term of this patent is extended or adjusted under 35 U.S.C. 154(b) by 130 days.

(21) Appl. No.: 14/688,209

(22) Filed: Apr. 16, 2015

Related U.S. Application Data

(63) Continuation-in-part of application No. 14/216,627, filed on Mar. 17, 2014, now Pat. No. 9,798,688.
(Continued)

(51) Int. Cl.
*G06F 13/36* (2006.01)
*G06F 11/20* (2006.01)
(Continued)

(52) U.S. Cl.
CPC ........ *G06F 11/2007* (2013.01); *G06F 11/202* (2013.01); *G06F 11/2002* (2013.01);
(Continued)

(58) Field of Classification Search
None
See application file for complete search history.

(56) References Cited

U.S. PATENT DOCUMENTS

| 4,402,040 A | 8/1983 | Evett |
| 4,752,871 A | 6/1988 | Sparks |

(Continued)

FOREIGN PATENT DOCUMENTS

| CN | 103401696 A | * 11/2013 |
| JP | 2005142859 A | 6/2005 |

(Continued)

OTHER PUBLICATIONS

'Amazon Route 53 Developer Guide' API Version Apr. 1, 2013, copyright 2017 by Amazon Web Services.*
(Continued)

*Primary Examiner* — Steven Snyder

(57) ABSTRACT

In an embodiment of the invention, an apparatus comprises: a plurality of bus masters and a plurality of bus arbiters to support routing and failover, wherein each bus arbiter is coupled to a plurality of bus masters; and a central processing unit (CPU) coupled to at least one of the bus arbiters; wherein the CPU is configured to execute a firmware that chooses bus re-routing or failover in response to a bus failure. In another embodiment of the invention, a method comprises: choosing, by a central processing unit (CPU) coupled to a plurality of bus arbiters, bus re-routing or failover in response to a bus failure. In yet another embodiment of the invention, an article of manufacture, comprises a non-transient computer-readable medium having stored thereon instructions that permit a method comprising: choosing, by a central processing unit (CPU) coupled to a plurality of bus arbiters, bus re-routing or failover in response to a bus failure.

17 Claims, 17 Drawing Sheets

Related U.S. Application Data

(60) Provisional application No. 61/980,569, filed on Apr. 17, 2014, provisional application No. 61/789,644, filed on Mar. 15, 2013.

(51) Int. Cl.
*G06F 13/40* (2006.01)
*G06F 13/16* (2006.01)

(52) U.S. Cl.
CPC ...... *G06F 11/2005* (2013.01); *G06F 11/2017* (2013.01); *G06F 11/2023* (2013.01); *G06F 11/2041* (2013.01); *G06F 13/1605* (2013.01); *G06F 13/4031* (2013.01)

(56) References Cited

U.S. PATENT DOCUMENTS

| | | | |
|---|---|---|---|
| 4,967,344 A | 10/1990 | Scavezze et al. | |
| 5,111,058 A | 5/1992 | Martin | |
| 5,136,498 A * | 8/1992 | McLaughlin | G06F 11/2017 700/3 |
| RE34,100 E | 10/1992 | Hartness | |
| 5,222,046 A | 6/1993 | Kreifels et al. | |
| 5,297,148 A | 3/1994 | Harari et al. | |
| 5,339,404 A | 8/1994 | Vandling, III | |
| 5,341,339 A | 8/1994 | Wells | |
| 5,371,709 A | 12/1994 | Fisher et al. | |
| 5,379,401 A | 1/1995 | Robinson et al. | |
| 5,388,083 A | 2/1995 | Assar et al. | |
| 5,396,468 A | 3/1995 | Harari et al. | |
| 5,406,529 A | 4/1995 | Asano | |
| 5,432,748 A | 7/1995 | Hsu et al. | |
| 5,448,577 A | 9/1995 | Wells et al. | |
| 5,459,850 A | 10/1995 | Clay et al. | |
| 5,479,638 A | 12/1995 | Assar et al. | |
| 5,485,595 A | 1/1996 | Assar et al. | |
| 5,488,711 A | 1/1996 | Hewitt et al. | |
| 5,500,826 A | 3/1996 | Hsu et al. | |
| 5,509,134 A | 4/1996 | Fandrich et al. | |
| 5,513,138 A | 4/1996 | Manabe et al. | |
| 5,524,231 A | 6/1996 | Brown | |
| 5,530,828 A | 6/1996 | Kaki et al. | |
| 5,535,328 A | 7/1996 | Harari et al. | |
| 5,535,356 A | 7/1996 | Kim et al. | |
| 5,542,042 A | 7/1996 | Manson | |
| 5,542,082 A | 7/1996 | Solhjell | |
| 5,548,741 A | 8/1996 | Watanabe | |
| 5,559,956 A | 9/1996 | Sukegawa | |
| 5,568,423 A | 10/1996 | Jou et al. | |
| 5,568,439 A | 10/1996 | Harari | |
| 5,572,466 A | 11/1996 | Sukegawa | |
| 5,594,883 A | 1/1997 | Pricer | |
| 5,602,987 A | 2/1997 | Harari et al. | |
| 5,603,001 A | 2/1997 | Sukegawa et al. | |
| 5,606,529 A | 2/1997 | Honma et al. | |
| 5,606,532 A | 2/1997 | Lambrache et al. | |
| 5,619,470 A | 4/1997 | Fukumoto | |
| 5,627,783 A | 5/1997 | Miyauchi | |
| 5,640,349 A | 6/1997 | Kakinuma et al. | |
| 5,644,784 A | 7/1997 | Peek | |
| 5,682,509 A | 10/1997 | Kabenjian | |
| 5,737,742 A | 4/1998 | Achiwa et al. | |
| 5,787,466 A | 7/1998 | Berliner | |
| 5,796,182 A | 8/1998 | Martin | |
| 5,799,200 A | 8/1998 | Brant et al. | |
| 5,802,554 A | 9/1998 | Caceres et al. | |
| 5,819,307 A | 10/1998 | Iwamoto et al. | |
| 5,822,251 A | 10/1998 | Bruce et al. | |
| 5,864,653 A | 1/1999 | Tavallaei et al. | |
| 5,875,351 A | 2/1999 | Riley | |
| 5,881,264 A | 3/1999 | Kurosawa | |
| 5,913,215 A | 6/1999 | Rubinstein et al. | |
| 5,918,033 A | 6/1999 | Heeb et al. | |
| 5,933,849 A | 8/1999 | Srbljic et al. | |
| 5,943,421 A | 8/1999 | Grabon | |
| 5,956,743 A | 9/1999 | Bruce et al. | |
| 5,987,621 A * | 11/1999 | Duso | G06F 11/2023 348/E5.008 |
| 6,000,006 A | 12/1999 | Bruce et al. | |
| 6,014,709 A | 1/2000 | Gulick et al. | |
| 6,076,137 A | 6/2000 | Asnaashari | |
| 6,098,119 A | 8/2000 | Surugucchi et al. | |
| 6,128,303 A | 10/2000 | Bergantino | |
| 6,138,200 A | 10/2000 | Ogilvie | |
| 6,138,247 A | 10/2000 | McKay et al. | |
| 6,215,875 B1 | 4/2001 | Nohda | |
| 6,230,269 B1 | 5/2001 | Spies et al. | |
| 6,298,071 B1 | 10/2001 | Taylor et al. | |
| 6,363,441 B1 | 3/2002 | Beniz et al. | |
| 6,363,444 B1 | 3/2002 | Platko et al. | |
| 6,397,267 B1 | 5/2002 | Chong, Jr. | |
| 6,404,772 B1 | 6/2002 | Beach et al. | |
| 6,496,939 B2 | 12/2002 | Portman et al. | |
| 6,526,506 B1 | 2/2003 | Lewis | |
| 6,529,416 B2 | 3/2003 | Bruce et al. | |
| 6,539,451 B1 * | 3/2003 | Zani | G06F 11/2005 710/110 |
| 6,557,095 B1 | 4/2003 | Henstrom | |
| 6,574,142 B2 * | 6/2003 | Gelke | G11C 16/102 365/185.11 |
| 6,678,754 B1 | 1/2004 | Soulier | |
| 6,744,635 B2 | 6/2004 | Portman et al. | |
| 6,757,845 B2 | 12/2004 | Bruce | |
| 6,857,076 B1 | 2/2005 | Klein | |
| 6,901,499 B2 | 5/2005 | Aasheim et al. | |
| 6,922,391 B1 | 7/2005 | King et al. | |
| 6,961,805 B2 | 11/2005 | Lakhani et al. | |
| 6,970,446 B2 | 11/2005 | Krischar et al. | |
| 6,970,890 B1 | 11/2005 | Bruce et al. | |
| 6,973,546 B2 | 12/2005 | Johnson | |
| 6,980,795 B1 | 12/2005 | Hermann et al. | |
| 6,999,411 B1 * | 2/2006 | Brewer | H04L 45/28 370/220 |
| 7,103,684 B2 | 9/2006 | Chen et al. | |
| 7,174,438 B2 | 2/2007 | Homma et al. | |
| 7,194,766 B2 | 3/2007 | Noehring et al. | |
| 7,263,006 B2 | 8/2007 | Aritome | |
| 7,283,629 B2 | 10/2007 | Kaler et al. | |
| 7,305,548 B2 | 12/2007 | Pierce et al. | |
| 7,330,954 B2 | 2/2008 | Nangle | |
| 7,372,962 B2 | 6/2008 | Fujimoto et al. | |
| 7,386,662 B1 | 6/2008 | Kekre et al. | |
| 7,415,549 B2 | 8/2008 | Vemula et al. | |
| 7,424,553 B1 | 9/2008 | Borrelli et al. | |
| 7,430,650 B1 | 9/2008 | Ross | |
| 7,490,177 B2 | 2/2009 | Kao | |
| 7,500,063 B2 | 3/2009 | Zohar et al. | |
| 7,506,098 B2 | 3/2009 | Arcedera et al. | |
| 7,613,876 B2 | 11/2009 | Bruce et al. | |
| 7,620,748 B1 | 11/2009 | Bruce et al. | |
| 7,624,239 B2 | 11/2009 | Bennett et al. | |
| 7,636,801 B1 | 12/2009 | Kekre et al. | |
| 7,660,941 B2 | 2/2010 | Lee et al. | |
| 7,676,640 B2 | 3/2010 | Chow | |
| 7,681,188 B1 | 3/2010 | Tirumalai et al. | |
| 7,716,389 B1 | 5/2010 | Bruce et al. | |
| 7,743,202 B2 | 6/2010 | Tsai et al. | |
| 7,765,359 B2 | 7/2010 | Kang et al. | |
| 7,877,639 B2 | 1/2011 | Hoang | |
| 7,913,073 B2 | 3/2011 | Choi | |
| 7,921,237 B1 | 4/2011 | Holland et al. | |
| 7,934,052 B2 | 4/2011 | Prins et al. | |
| 8,010,740 B2 | 10/2011 | Arcedera et al. | |
| 8,032,700 B2 | 10/2011 | Bruce et al. | |
| 8,156,320 B2 | 4/2012 | Borras | |
| 8,161,223 B1 | 4/2012 | Chamseddine et al. | |
| 8,165,301 B1 | 4/2012 | Bruce et al. | |
| 8,200,879 B1 | 6/2012 | Falik et al. | |
| 8,341,300 B1 * | 12/2012 | Karamcheti | G06F 13/1642 710/5 |
| 8,341,311 B1 | 12/2012 | Szewerenko et al. | |
| 8,375,257 B2 | 2/2013 | Hong et al. | |
| 8,447,908 B2 | 5/2013 | Bruce et al. | |

(56) References Cited

U.S. PATENT DOCUMENTS

| | | | |
|---|---|---|---|
| 8,489,914 B2* | 7/2013 | Cagno | G06F 11/2089 714/11 |
| 8,510,631 B2 | 8/2013 | Wu et al. | |
| 8,560,804 B2 | 10/2013 | Bruce et al. | |
| 8,707,134 B2 | 4/2014 | Takahashi et al. | |
| 8,713,417 B2 | 4/2014 | Jo | |
| 8,788,725 B2 | 7/2014 | Bruce et al. | |
| 8,959,307 B1 | 2/2015 | Bruce et al. | |
| 9,043,669 B1 | 5/2015 | Bruce et al. | |
| 9,099,187 B2 | 8/2015 | Bruce et al. | |
| 9,135,190 B1 | 9/2015 | Bruce et al. | |
| 9,147,500 B2 | 9/2015 | Kim et al. | |
| 9,201,790 B2* | 12/2015 | Keeler | G06F 3/0607 |
| 9,460,042 B2* | 10/2016 | Iskandar | G06F 13/4031 |
| 2001/0010066 A1 | 7/2001 | Chin et al. | |
| 2002/0011607 A1* | 1/2002 | Gelke | G11C 16/102 257/200 |
| 2002/0013880 A1* | 1/2002 | Gappisch | G11C 7/10 711/103 |
| 2002/0044486 A1 | 4/2002 | Chan et al. | |
| 2002/0073324 A1 | 6/2002 | Hsu et al. | |
| 2002/0083262 A1 | 6/2002 | Fukuzumi | |
| 2002/0083264 A1 | 6/2002 | Coulson | |
| 2002/0141244 A1 | 10/2002 | Bruce et al. | |
| 2003/0023817 A1 | 1/2003 | Rowlands et al. | |
| 2003/0065836 A1 | 4/2003 | Pecone | |
| 2003/0097248 A1 | 5/2003 | Terashima et al. | |
| 2003/0120864 A1 | 6/2003 | Lee et al. | |
| 2003/0131201 A1 | 7/2003 | Khare et al. | |
| 2003/0163624 A1 | 8/2003 | Matsui et al. | |
| 2003/0163647 A1 | 8/2003 | Cameron et al. | |
| 2003/0163649 A1 | 8/2003 | Kapur et al. | |
| 2003/0182576 A1 | 9/2003 | Morlang et al. | |
| 2003/0204675 A1 | 10/2003 | Dover et al. | |
| 2003/0223585 A1 | 12/2003 | Tardo et al. | |
| 2004/0073721 A1 | 4/2004 | Goff et al. | |
| 2004/0078632 A1* | 4/2004 | Infante | G06F 3/0613 714/4.2 |
| 2004/0128553 A1 | 7/2004 | Buer et al. | |
| 2004/0223503 A1* | 11/2004 | Lynch | H04L 12/437 370/404 |
| 2005/0050245 A1 | 3/2005 | Miller et al. | |
| 2005/0055481 A1* | 3/2005 | Chou | G06F 13/387 710/52 |
| 2005/0102456 A1* | 5/2005 | Kang | G06F 13/4031 710/113 |
| 2005/0120146 A1 | 6/2005 | Chen et al. | |
| 2005/0210149 A1 | 9/2005 | Kimball | |
| 2005/0240707 A1 | 10/2005 | Hayashi et al. | |
| 2005/0243610 A1 | 11/2005 | Guha et al. | |
| 2005/0289361 A1 | 12/2005 | Sutardja | |
| 2006/0004957 A1 | 1/2006 | Hand, III et al. | |
| 2006/0026329 A1 | 2/2006 | Yu | |
| 2006/0031450 A1 | 2/2006 | Unrau et al. | |
| 2006/0095709 A1 | 5/2006 | Achiwa | |
| 2006/0112251 A1 | 5/2006 | Karr et al. | |
| 2006/0184723 A1 | 8/2006 | Sinclair et al. | |
| 2007/0019573 A1 | 1/2007 | Nishimura | |
| 2007/0028040 A1 | 2/2007 | Sinclair | |
| 2007/0058478 A1 | 3/2007 | Murayama | |
| 2007/0073922 A1 | 3/2007 | Go et al. | |
| 2007/0083680 A1 | 4/2007 | King et al. | |
| 2007/0088864 A1 | 4/2007 | Foster | |
| 2007/0094450 A1 | 4/2007 | VanderWiel | |
| 2007/0096785 A1 | 5/2007 | Maeda | |
| 2007/0121499 A1 | 5/2007 | Pal et al. | |
| 2007/0130439 A1 | 6/2007 | Andersson et al. | |
| 2007/0159885 A1 | 7/2007 | Gorobets | |
| 2007/0168754 A1 | 7/2007 | Zohar et al. | |
| 2007/0174493 A1 | 7/2007 | Irish et al. | |
| 2007/0174506 A1 | 7/2007 | Tsuruta | |
| 2007/0195957 A1 | 8/2007 | Arulambalam et al. | |
| 2007/0288686 A1 | 12/2007 | Arcedera et al. | |
| 2007/0288692 A1 | 12/2007 | Bruce et al. | |
| 2008/0052456 A1 | 2/2008 | Ash et al. | |
| 2008/0052585 A1 | 2/2008 | LaBerge et al. | |
| 2008/0072031 A1 | 3/2008 | Choi | |
| 2008/0147963 A1 | 6/2008 | Tsai et al. | |
| 2008/0189466 A1 | 8/2008 | Hemmi | |
| 2008/0218230 A1 | 9/2008 | Shim | |
| 2008/0228959 A1 | 9/2008 | Wang | |
| 2009/0055573 A1 | 2/2009 | Ito | |
| 2009/0077306 A1 | 3/2009 | Arcedera et al. | |
| 2009/0083022 A1 | 3/2009 | Bin Mohd Nordin et al. | |
| 2009/0094411 A1 | 4/2009 | Que | |
| 2009/0158085 A1 | 6/2009 | Kern et al. | |
| 2009/0172250 A1 | 7/2009 | Allen et al. | |
| 2009/0172466 A1 | 7/2009 | Royer et al. | |
| 2009/0240873 A1 | 9/2009 | Yu et al. | |
| 2010/0058045 A1 | 3/2010 | Borras et al. | |
| 2010/0095053 A1 | 4/2010 | Bruce et al. | |
| 2010/0125695 A1 | 5/2010 | Wu et al. | |
| 2010/0250806 A1 | 9/2010 | Devilla et al. | |
| 2010/0318706 A1 | 12/2010 | Kobayashi | |
| 2011/0022778 A1 | 1/2011 | Schibilla et al. | |
| 2011/0022801 A1 | 1/2011 | Flynn | |
| 2011/0087833 A1 | 4/2011 | Jones | |
| 2011/0093648 A1 | 4/2011 | Belluomini et al. | |
| 2011/0113186 A1 | 5/2011 | Bruce et al. | |
| 2011/0145479 A1 | 6/2011 | Talagala et al. | |
| 2011/0161568 A1 | 6/2011 | Bruce et al. | |
| 2011/0167204 A1 | 7/2011 | Estakhri et al. | |
| 2011/0197011 A1 | 8/2011 | Suzuki et al. | |
| 2011/0202709 A1 | 8/2011 | Rychlik | |
| 2011/0258405 A1 | 10/2011 | Asaki et al. | |
| 2011/0264884 A1 | 10/2011 | Kim | |
| 2011/0264949 A1 | 10/2011 | Ikeuchi et al. | |
| 2011/0270979 A1 | 11/2011 | Schlansker et al. | |
| 2012/0005405 A1 | 1/2012 | Wu et al. | |
| 2012/0005410 A1 | 1/2012 | Ikeuchi | |
| 2012/0017037 A1 | 1/2012 | Riddle et al. | |
| 2012/0102263 A1 | 4/2012 | Aswadhati | |
| 2012/0102268 A1 | 4/2012 | Smith et al. | |
| 2012/0137050 A1 | 5/2012 | Wang et al. | |
| 2012/0215973 A1* | 8/2012 | Cagno | G06F 11/2089 711/103 |
| 2012/0271967 A1 | 10/2012 | Hirschman | |
| 2012/0311197 A1 | 12/2012 | Larson et al. | |
| 2013/0094312 A1 | 4/2013 | Jang et al. | |
| 2013/0099838 A1 | 4/2013 | Kim et al. | |
| 2013/0111135 A1 | 5/2013 | Bell, Jr. et al. | |
| 2013/0208546 A1 | 8/2013 | Kim et al. | |
| 2013/0212337 A1 | 8/2013 | Maruyama | |
| 2013/0212349 A1 | 8/2013 | Maruyama | |
| 2013/0246694 A1 | 9/2013 | Bruce et al. | |
| 2013/0262750 A1 | 10/2013 | Yamasaki et al. | |
| 2013/0282933 A1 | 10/2013 | Jokinen et al. | |
| 2013/0304775 A1 | 11/2013 | Davis et al. | |
| 2013/0339578 A1 | 12/2013 | Ohya et al. | |
| 2013/0339582 A1 | 12/2013 | Olbrich et al. | |
| 2013/0346672 A1 | 12/2013 | Sengupta et al. | |
| 2014/0095803 A1 | 4/2014 | Kim et al. | |
| 2014/0104949 A1 | 4/2014 | Bruce et al. | |
| 2014/0108869 A1 | 4/2014 | Brewerton et al. | |
| 2014/0189203 A1 | 7/2014 | Suzuki et al. | |
| 2014/0258788 A1 | 9/2014 | Maruyama | |
| 2014/0285211 A1 | 9/2014 | Raffinan | |
| 2014/0331034 A1 | 11/2014 | Ponce et al. | |
| 2015/0006766 A1 | 1/2015 | Ponce et al. | |
| 2015/0012690 A1 | 1/2015 | Bruce et al. | |
| 2015/0032937 A1 | 1/2015 | Salessi | |
| 2015/0032938 A1 | 1/2015 | Salessi | |
| 2015/0067243 A1 | 3/2015 | Salessi et al. | |
| 2015/0149697 A1 | 5/2015 | Salessi et al. | |
| 2015/0149706 A1 | 5/2015 | Salessi et al. | |
| 2015/0153962 A1 | 6/2015 | Salessi et al. | |
| 2015/0169021 A1 | 6/2015 | Salessi et al. | |
| 2015/0261456 A1 | 9/2015 | Alcantara et al. | |
| 2015/0261475 A1 | 9/2015 | Alcantara et al. | |
| 2015/0261797 A1 | 9/2015 | Alcantara et al. | |
| 2015/0370670 A1 | 12/2015 | Lu | |
| 2015/0371684 A1 | 12/2015 | Mataya | |
| 2015/0378932 A1 | 12/2015 | Souri et al. | |

(56) References Cited

U.S. PATENT DOCUMENTS

| | | | |
|---|---|---|---|
| 2016/0026402 | A1 | 1/2016 | Alcantara et al. |
| 2016/0027521 | A1 | 1/2016 | Lu |
| 2016/0041596 | A1 | 2/2016 | Alcantara et al. |

FOREIGN PATENT DOCUMENTS

| | | |
|---|---|---|
| JP | 2005-309847 | 11/2005 |
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

'Host Bus Adapters (HBAs): What you need to know about a storage networking workhorse' by Alan Earls, Feb. 2003.*
Office Action dated Sep. 11, 2015 for U.S. Appl. No. 14/217,436.
Office Action dated Sep. 24, 2015 for U.S. Appl. No. 14/217,334.
Office Action dated Sep. 18, 2015 for Taiwanese Patent Application No. 102144165.
Office Action dated Sep. 29, 2015 for U.S. Appl. No. 14/217,316.
Office Action dated Sep. 28, 2015 for U.S. Appl. No. 14/689,045.
Notice of allowance/allowability for U.S. Appl. No. 14/217,041 dated Apr. 11, 2016.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution (author(s) not indicated), Jul. 31, 2014.
http://www.design-reuse.com/news/35111/nxgn-data-intelligent-solutions.html, printed on Feb. 13, 2016 (author(s) not indicated).
Office Action for U.S. Appl. No. 13/475,878, dated Jun. 23, 2014.
Office Action for U.S. Appl. No. 13/253,912 dated Jul. 16, 2014.
Office Action for U.S. Appl. No. 12/876,113 dated Jul. 11, 2014.
Office Action for U.S. Appl. No. 12/270,626 dated Feb. 3, 2012.
Office Action for U.S. Appl. No. 12/270,626 dated Apr. 4, 2011.
Office Action for U.S. Appl. No. 12/270,626 dated Mar. 15, 2013.
Notice of Allowance/Allowability for U.S. Appl. No. 12/270,626 dated Oct. 3, 2014.
Advisory Action for U.S. Appl. No. 12/876,113 dated Oct. 16, 2014.
Office Action for U.S. Appl. No. 14/297,628 dated Jul. 17, 2015.
Office Action for U.S. Appl. No. 13/475,878 dated Dec. 4, 2014.
Office Action dated Oct. 5, 2015 for Taiwanese Application No. 103105076.
Office Action dated Nov. 19, 2015 for U.S. Appl. No. 14/217,249.
Office Action dated Nov. 18, 2015 for U.S. Appl. No. 14/217,467.
Office Action dated Dec. 4, 2015 for U.S. Appl. No. 14/616,700.
Office Action dated Jun. 4, 2015 for U.S. Appl. No. 14/215,414.
Office Action for U.S. Appl. No. 13/475,878 dated Jun. 23, 2014.
Office Action for U.S. Appl. No. 12/876,113 dated Oct. 16, 2014.
Notice of Allowance for U.S. Appl. No. 12/270,626 dated Oct. 3, 2014.
Office Action for U.S. Appl. No. 12/270,626 dated May 23, 2014.
Office Action for U.S. Appl. No. 12/270,626 dated Dec. 18, 2013.
Office Action for U.S. Appl. No. 12/270,626 dated Aug. 23, 2012.
Office Action dated Oct. 8, 2015 for U.S. Appl. No. 14/217,291.
Final Office Action dated Nov. 19, 2015 for U.S. Appl. No. 14/217,249.
Final Office Action dated Nov. 18, 2015 for U.S. Appl. No. 14/217,467.
Office Action dated Nov. 25, 2015 for U.S. Appl. No. 14/217,041.
Notice of Allowance/Allowability for U.S. Appl. No. 13/890,229 dated Feb. 20, 2014.
Office Action for U.S. Appl. No. 13/890,229 dated Oct. 8, 2013.
Office Action for U.S. Appl. No. 12/876,113 dated Dec. 5, 2014.
Notice of Allowance/Allowabilty for U.S. Appl. No. 12/876,113 dated Jun. 22, 2015.
Office Action for U.S. Appl. No. 14/217,249 dated Apr. 23, 2015.
Office Action for U.S. Appl. No. 14/217,467 dated Apr. 27, 2015.
Office Action for U.S. Appl. No. 14/616,700 dated Apr. 30, 2015.
Office Action for U.S. Appl. No. 14/217,436 dated Sep. 11, 2015.
Office Action for U.S. Appl. No. 12/876,113 dated Mar. 13, 2014.
Advisory Action for U.S. Appl. No. 12/876,113 dated Sep. 6, 2013.
Office Action for U.S. Appl. No. 12/876,113 dated May 14, 2013.
Office Action for U.S. Appl. No. 12/876,113 dated Dec. 21, 2012.
William Stallings, Security Comes to SNMP: The New SNMPv3 Proposed Internet Standard, The Internet Protocol Journal, vol. 1, No. 3, Dec. 1998.
Notice of Allowability for U.S. Appl. No. 12/882,059 dated May 30, 2013.
Notice of Allowability for U.S. Appl. No. 12/882,059 dated Feb. 14, 2013.
Office Action for U.S. Appl. No. 12/882,059 dated May 11, 2012.
Notice of Allowability for U.S. Appl. No. 14/038,684 dated Aug. 1, 2014.
Office Action for U.S. Appl. No. 14/038,684 dated Mar. 17, 2014.
Office Action for U.S. Appl. No. 14/217,249 dated Apr. 21, 2016.
Notice of allowance/allowability for U.S. Appl. No. 14/217,467 dated Apr. 20, 2016.
Notice of allowance/allowability for U.S. Appl. No. 14/214,216 dated Apr. 27, 2016.
Notice of allowance/allowability for U.S. Appl. No. 14/217,436 dated May 6, 2016.
USPTO Notice of Allowability & attachment(s) dated Jan. 7, 2013 for U.S. Appl. No. 12/876,247.
Office Action dated Sep. 14, 2012 for U.S. Appl. No. 12/876,247.
Office Action dated Feb. 1, 2012 for U.S. Appl. No. 12/876,247.
Notice of Allowance/Allowability dated Mar. 31, 2015 for U.S. Appl. No. 13/475,878.
Office Action dated May 22, 2015 for U.S. Appl. No. 13/253,912.
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Notice of allowance/allowability for U.S. Appl. No. 13/253,912 dated Mar. 21, 2016.
Notice of allowance/allowability for U.S. Appl. No. 14/803,107 dated Mar. 28, 2016.
Office Action for U.S. Appl. No. 14/217,334 dated Apr. 4, 2016.
Office Action dated Dec. 15, 2015 for U.S. Appl. No. 13/253,912.
Office Action dated Dec. 17, 2015 for U.S. Appl. No. 14/214,216.
Office Action dated Dec. 17, 2015 for U.S. Appl. No. 14/215,414.
Office Action dated Dec. 17, 2015 for U.S. Appl. No. 14/803,107.
Office Action dated Jan. 15, 2016 for U.S. Appl. No. 14/866,946.
Office Action dated Jan. 11, 2016 for U.S. Appl. No. 14/217,399.
Office Action dated Jan. 15, 2016 for U.S. Appl. No. 14/216,937.
Notice of Allowance and Examiner-Initiated Interview Summary, dated Jan. 29, 2016 for U.S. Appl. No. 14/297,628.
Office Action dated Dec. 5, 2014 for U.S. Appl. No. 14/038,684.
Notice of allowance/allowability for U.S. Appl. No. 14/216,627 dated Jun. 15, 2017.
Notice of allowance/allowability for U.S. Appl. No. 14/216,627 dated Mar. 1, 2017.
Office Action for U.S. Appl. No. 14/216,627 dated Nov. 7, 2016.

* cited by examiner

BUS ARBITRATION WITH ROUTING AND FAILOVER MECHANISM

CROSS-REFERENCE(S) TO RELATED APPLICATIONS

This application claims the benefit of and priority to U.S. Provisional Application 61/980,569, filed 17 Apr. 2014. This U.S. Provisional Application 61/980,569 is hereby fully incorporated herein by reference.

This application is a continuation in part of U.S. application Ser. No. 14/216,627, entitled BUS ARBITRATION WITH ROUTING AND FAILOVER MECHANISM, which claims the benefit of and priority to U.S. Provisional Application 61/789,644, filed 15 Mar. 2013. This U.S. Provisional Application 61/789,644 and U.S. application Ser. No. 14/216,627 are hereby fully incorporated herein by reference.

FIELD

Embodiments of the invention relate generally to a reliability technique using bus re-routing and failover mechanism in a bus system particularly comprising of a plurality of bus masters and slave devices connected using a common bus.

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

It is widely recognized that as the computer system networks continue to grow, so also do the demands for performance, adaptability, reliability and high availability. Conventional computer system has the ability to support fully redundant architecture and failover.

Common implementation of a redundant architecture and failover mechanism is applied in a system level architecture of computer systems, where redundant components are usually managed by software that provides fault detection and correction procedures to maximize availability of the critical services and application provided by that system. An example of a system level implementation of redundant architecture is in an IP network that provides failover mechanism when a router fails or when links between hosts and clients fail. In response to this, designers developed several methods and as well as improvements to provide failover features. Basically in a network, the failover process involves a brief interruption in services. The failover recognition and failover process is then triggered to initialize the services on a backup server. This process occurs automatically without human intervention.

Board level or chip level architecture involves also the use of Redundant Array of Independent Disks (RAID) and has become commonplace in serving storage environments. The RAID system is an external device that is usually connected between two or more servers managed by a RAID controller. To ensure reliability with the system, a failover mechanism is implemented.

Mainly, a failover mechanism is a method of how the system operates in a board level or chip level architecture in the event when one or more or the controllers that manages internal/external devices, mirrored devices or other memory devices fails in a system implemented on applied specific integrated circuits (ASIC).

One example of a failover method is described, in example, U.S. Pat. No. 6,578,158 B1 to Dietz et al, which uses a fibre channel arbitrated loop to provide failover and failback mechanism for failed controllers. The method includes disabling the failed controller and instructing the surviving controller to assume the identity of the failed component.

Loops are used to connect a host computer to controller and controller to the RAID system. Though the invention is efficient, unfortunately it is limited to certain prospects: (1) the invention focuses on the failure of the RAID controller component and does not include the failure of a loop or path connections (2) the invention is specific for RAID devices (3) lastly, it is limited to fibre channel loops.

Moreover, described in U.S. Pat. No. 6,681,339 B1 to McKean et al, to circumvent failover, a dual-controller mechanism is used to provide redundancy. The first and secondary controller are coupled to one another so that in the event of a controller failure, the surviving controller will takeover the task performed by the failed controller.

Though the above commonly-owned and commonly-assigned patents provide a solution to certain failover problems, it only provides an answer to one certain failure and that is the failure of a controller component. It does not provide a solution to the case wherein a link in the computer system fails. The case between the failure of a component and the failure of a link or path is different.

When a controller component fails in a system, host or other components attached to it is rendered as unusable unless a redundant path is prepared to redirect all the signals of a certain host to a secondary controller component. These are the scenarios provided in the mentioned patents. On the other hand, when a link or a path fails between a controller component and a storage device, the host or components attached to the controller component are still considered operational. Certain methods can be used to do so, for example, the controller component which these devices are attached can perform the role of a router to select available paths to allow communication between the host and the storage devices.

The second case of failover is best described using U.S. Pat. No. 5,822,251 to Bruce et al, to hereby consider as reference. In the invention, controller component is implemented on an applied specific integrated circuit (ASIC) wherein a dual flash specific DMA controller is used to control expandable flash memory devices. The connection is achieved using flash bus "buddy lines" to allow the DMA controller to perform flash commands and data transfer from the controller chip and the flash memory module. Though the patent provides flash bus "buddy lines" as its mechanism for redundancy, unfortunately it does not consider the probability of a flash bus failure.

Unfortunately, the method is limited to usage of a fibre channel arbitrated loop architecture.

SUMMARY

An embodiment of the present invention features a technique for robustness and availability of a storage system by providing a method of bus routing and failover mechanism to bus arbiters comprising the system. More specifically, an embodiment of the present invention offers a set of techniques for providing failover and routing of long running connections across a distributed collection of bus masters and slave devices and is useful for fault-tolerant and load-balanced distribution of data, control and command signals.

In one embodiment of the invention, a system architecture for bus masters and bus arbiters are provided to support routing and failover. The system comprises large pools of bus masters, a plurality of sets can be configured to control a plurality of slave devices wherein each set contains a collection of bus masters attached to a central arbiter driving one of the system buses. Each set controls a group(s) of slave devices that are primarily controlled by the bus master(s) within the set. Hence, a system can therefore include a plurality of sets and can control a group of slave devices. In the system, arbiters do not only perform the duty of bus arbitration but they also serve as the health monitoring device wherein they constantly monitor the condition of the bus attached to them and are capable of generating a status signal enabling the system to operate in a routing or failover mode. Each arbiter is assigned to a bus and is provided by a bus identification code. To promote flexibility in the system, an arbiter priority selector is provided wherein when the routing or failover mode is enabled, the selector decides which bus is to be utilized or re-used.

According to one embodiment of the present invention, in the event of a bus failure, the arbiter connected to that failed bus sends a status signal to the arbiter priority select enabling the selection among the surviving bus to which the bus masters from the disabled bus can access. The data, commands and control signals of the bus masters from the disabled bus that is allowed to perform bus transaction in a secondary bus is migrated to the secondary arbiter. This ability can allow bus masters from the disabled bus to continue bus transaction in the event of a bus failure.

In another embodiment of the present invention, in the event that a bus is idle or left unused due to inactive bus master, the arbiter connected to the idle bus can accept external request from other arbiters to re-route data, commands and control signals. In the event of long-running bus transaction, a certain arbiter can possibly be congested of bus request from a plurality of bus masters in which it is connected. Detecting the congestion, the arbiter sends a status signal to the arbiter priority select enabling the routing mode of the system. In this case, the arbiter priority select chooses among the idle bus(es) to which it can use to re-route other requests and bus transactions.

In another embodiment of the invention, a system architecture for bus masters and bus arbiters are provided to support routing and failover. A CPU or an arbiter priority select determines re-routing or failover between buses. Point-to-point flashbus topology may be used to connect the components in the system architecture. The system comprises large pools of bus masters, a plurality of sets can be configured to control a plurality of slave devices wherein each set contains a collection of bus masters attached to central arbiter driving one of the system buses. Each set controls a group(s) of slave device that are primarily controlled by the bus master(s) within the set. Hence, a system can, therefore, include of a plurality of sets and can control a group of slave devices.

In an embodiment of the invention, an apparatus comprises: a plurality of bus masters and a plurality of bus arbiters to support routing and failover, wherein each bus arbiter is coupled to a plurality of bus masters; and a central processing unit (CPU) coupled to at least one of the bus arbiters; wherein the CPU is configured to execute a firmware that chooses bus re-routing or failover in response to a bus failure.

In another embodiment of the invention, a method comprises: choosing, by a central processing unit (CPU) coupled to a plurality of bus arbiters, bus re-routing or failover in response to a bus failure.

In yet another embodiment of the invention, an article of manufacture, comprises a non-transient computer-readable medium having stored thereon instructions that permit a method comprising: choosing, by a central processing unit (CPU) coupled to a plurality of bus arbiters, bus re-routing or failover in response to a bus failure.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

DETAILED DESCRIPTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

In the following description and in the claims, the terms "include" and "comprise" are used in an open-ended fashion, and thus should be interpreted to mean "include, but not limited to . . . ". Also, the term "couple" (or "coupled") is intended to mean either an indirect or direct electrical connection (or an indirect or direct optical connection). Accordingly, if one device is coupled to another device, then that connection may be through a direct electrical (or optical) connection, or through an indirect electrical (or optical) connection via other devices and/or other connections.

Figure 1:
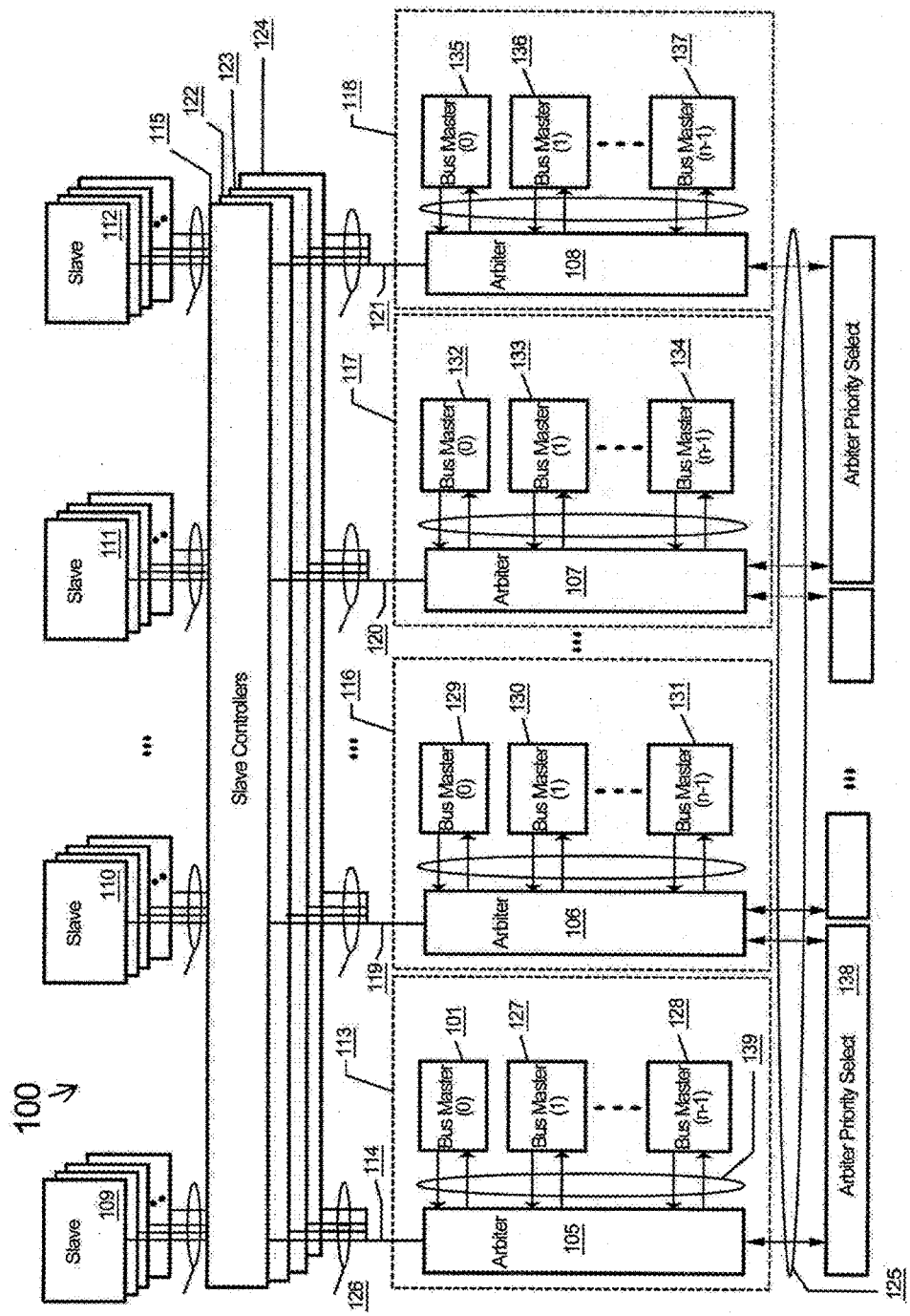
FIG. 1 is a diagram illustrating an embodiment of a system comprising of a plurality of bus masters driving the system buses, with bus arbiters, slave controllers and slave devices according to the embodiment of the present invention.

FIG. 1 is a diagram illustrating a system comprising of a plurality of bus masters driving the system buses, with bus arbiters, slave controllers and slave devices according to the embodiment of the present invention.

The present invention provides a system 100 with large pool of bus masters (101, 127, 128, 129, 130, 131, 132, 133, 134, 135, 136 and 137) from which a subset may be selected and configured to form a cluster of bus masters that controls a group of slave devices (109, 110, 111 and 112) through the system buses (114, 119, 120 and 121). The architecture can be specifically arranged in a progressive expansion wherein a plurality of sets can be formed containing 0 to n−1 number of bus masters. Bus masters 101, 127, 128, 129, 130, 131, 132, 133, 134, 135, 136 and 137 together with their respective arbiters are preferably contained in a single Application Specific Integrated Circuit (ASIC).

As shown in FIG. 1, a set 113 of bus masters (101, 127 and 128) is connected to a plurality of slave devices 109 through a single bus 114. The bus 114 is attached to the slave controller 115 that manages several slave devices 109. Each bus master 101, 127 and 128 within the set 113 can access the bus 114 through the bus arbiter 105. Bus masters 101, 127 and 128 communicate to the bus arbiter 105 using control and data lines 139.

Under certain embodiment of the present invention, a plurality of subsets (113, 116, 117 and 118) can be formed in the system 100. For ease of description, system 100 is describe as including but not limited to the following: set 113 comprising of bus masters 101, 127 and 128 attached to bus 114 through a single arbiter 105; set 116 comprising of bus masters 129, 130 and 131 attached to bus 119 through a single arbiter 106; set 117 comprising of bus masters 132, 133 and 134 attached to bus 120 through a single arbiter 107 and set 118 comprising of bus masters 135, 136 and 137 attached to bus 121 through a single arbiter 108. The number of the mention components in the drawing (bus masters, slaves, arbiters, and slave controllers) are just for discussion purposes, the invention is not limited to these numbers.

To support bus routing and failure, an arbiter priority select 138 is provided in the system 100. The sets 113, 116, 117 and 118 are attached to the arbiter priority select 138 by their respective bus arbiters 105, 106, 107 and 108. Arbiters 105, 106, 107 and 108 uses a messaging link 125 to communicate to the arbiter priority select 138 in the event of the bus routing and bus failure. The messaging link 125 can be, but not limited to, a control or data signal. With the arbiter priority select 138, arbiters (105, 106, 107 and 108) in the system 100 can communicate with each other. The arbiter priority select 138 can be implemented with any or a combination of the following technologies: a state machine, logic circuits(s) having an appropriate combination of logic gates, etc.

Under certain embodiment of the present invention, once configured the arbiter priority select 138 can manage at least two sets (113, 116, 117 and 118) in the event of bus re-routing and failover. This will allow a minimum of two arbiters (105, 106, 107 and 108) to exchange information when routing and bus failure is performed. For example, in the event that bus 119 fails to perform data transfer from a set 116 of bus masters 129, 130 or 131, arbiter 106 sends information to arbiter priority select 138 that the bus 119 is no longer functioning. Arbiter priority select 138 then selects among the available buses (114, 120 or 121) of which it can allow a bus master from set 116 to gain bus access among the surviving buses. Arbiter priority select 138 will send a priority signal through the messaging link 125 to the surviving arbiters (105, 107 or 108) when it selects a bus (114, 120 or 121) of which the bus master from set 116 can access. With this configuration, the bus (114, 119, 120 or 121) owned by the sets (113, 116, 117 or 118) can be made into a shared bus.

The present invention is not limited to the event of a bus failure, it also supports a routing and redundancy mechanism for controls and data transfers in cases of unused, idle or inactive buses. For example, if bus master 131 is having a long transaction with bus 119, and at the same time bus master 129 is requesting access to bus 119 but bus 114 is not busy. Arbiter 106 signals arbiter priority select 138 that it wishes to utilize bus 114. This is an indication to arbiter 105 to accommodate bus master 129's request using message link 125. Arbiter 105 takes over arbiter 106's role in connecting bus master 129 to a slave controller connected to the requested slave.

The slaves 109, 110, 111 and 112 in the system 100 can be expanded by adding several slave controllers 122, 123 and 124. The figure shown shows an example of how the slave controllers 115, 122, 123 and 124 are attached to the bus 114, 119, 120, and 121. Bus 126 is a distributed version of bus 114 wherein the arbiter 105 is connected to the slave controllers 115, 122, 123, and 124. Same implementation is applied for the rest of the arbiters 106, 107 and 108 in the system 100.

Figure 2:
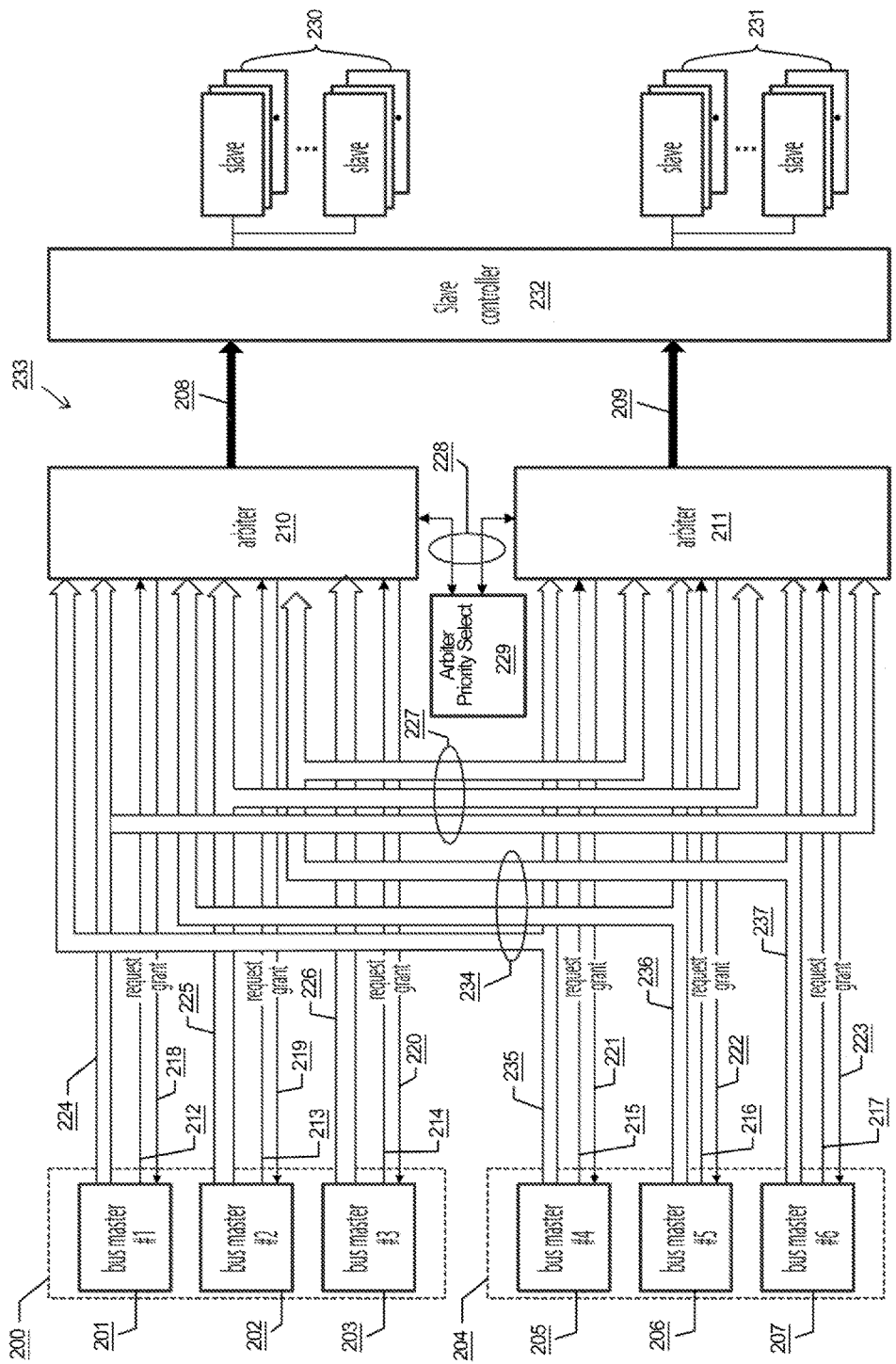
FIG. 2 is a diagram illustrating an example of one embodiment of the present invention.

FIG. 2 is a diagram illustrating an example of one embodiment of the present invention. In a preferred embodiment, system 233 comprising of a plurality of bus masters 201, 202, 203, 205, 206 and 207 is configured to form two sets 200 and 204. Bus masters 201, 202 and 203 are contained in set 200 and attached to a single arbiter 210. The arbiter 210 drives the bus 208 allowing any of the bus masters from set 200 to control the slave devices 230. These slave devices are owned by the masters from set 200 and are directly attached to the slave controller 232. A secondary set 204 is configured, comprising of bus masters 205, 206 and 207. Attached to it is an arbiter 211 which drives the bus 209. Slave devices 231 are owned by the bus masters from set 204 and are attached to the slave controller 232. The arbiters 210 and 211 are attached to a central arbiter priority select 229.

It was previously mentioned, that under the embodiment of the present invention, the number of sets is configurable to contain a plurality of bus masters. In the same manner a preferable configuration is that at least two arbiters are attached to an arbiter priority select 229.

The figure highlights the interconnectivity of the dual sets (200 and 204) to the arbiter (210 and 211) and link between arbiters 210 and 211 of each set. The figure also highlights the redundant paths established by the bus masters from set 200 and 204 for routing and failover support. For the purpose of this discussion two groups of slaves are also included.

Slave devices 230 are owned by the bus masters from set 200. In the light of this, the slaves 230 can receive data, command and control signals from any of the bus masters from set 200 that is in control of the bus 208. With the same implementation as mentioned above, slaves 231 are owned by the bus masters from 204. Therefore slaves 231 can receive data, command and control signals from any of the bus masters from set 204 that is in control of the bus 209. The slave controller 232 is directly connected to the bus 208 and 209 and it receives and translates any command and control signals from the bus masters of set 200 and 204 into slave specific commands and control signals.

As shown in the figure, a plurality of bus masters in set 200 and set 204 may be interconnected to a common unitary bus 208 and 209 via bus arbiters 210 and 211 respectively. Requests 212, 213 and 214 represents the bus arbitration request signal from bus masters 201, 202 and 203 respectively. In the same manner, request 215, 216 and 217 represents the bus arbitration request signal from bus masters 205, 206 and 207. The arbitration request signal indicates the type of transaction the bus masters wants to perform. The transaction can either be a data bus transfer or command/control bus transfer. Bus arbiters 210 and 211 perform multi-level priority arbitration among bus masters from block 200 and 204. Grant 218, 219 and 220 are bus grant signals from the arbiter 210 to the bus masters 201, 202 and 203 respectively indicating that the bus master can access the bus 208. Only one bus master from set 200 can access the bus 208 at a time. Similarly for arbiter 211, it outputs grants 221, 222 and 223 as bus grant signals for bus masters 205, 206 and 207 respectively, indicating that the bus master can access the bus 209. Only one bus master from 204 can access the bus 209 at a time.

Request signals from the bus masters of block 200 and block 204 are solely for their corresponding arbiters, 210 and 211 respectively. Request signals from block 200 are dedicated to arbiter 210 while request signals from block 204 are dedicated for arbiter 211.

Unlike the request and grant signals, data and controls/command paths are distributed among the arbiters 210 and 211. Data and control paths 224, 225 and 226 are the primary/default paths for data and control/command signals from bus masters 201, 202 and 203 respectively. This primary/default path for the bus masters from set 200 is connected to the arbiter 210 and is used during bus transaction when any of the bus masters from set 200 sends data, commands and controls to the slaves 230 via bus 208. Aside from the primary/default path that the bus masters from set 200 establish with arbiter 210, a secondary path is also established by these bus masters from set 200 to the arbiter 211. The paths 227 connect bus masters 201, 202 and 203 to arbiter 211. This connection is a secondary/alternative path for data and control signals of the bus masters in set 200 in the event when bus 208 fails to function or when arbiter 210 performs re-routing.

The corresponding set-up is analogous to the operation of bus masters in block 204 wherein the data and controls paths contain a primary/default path (235, 236 and 237) and secondary/alternative path 234. These paths are utilized both for routing and failover mechanism. With the secondary paths 234 and 227 performance and reliability is enhanced. Bus masters from set 200 and 204 can perform bus transaction to bus 208 and 209 providing a fault tolerant bus transaction.

During the process of arbitration in the event of re-routing and failover, the arbiter 210 and 211 communicates. With the presence of arbiter priority select 229 the messaging link 228 between the two is established. This messaging link 228 can be, but not limited to, a custom messaging exchange protocol, control signals etc. These signals comprising the messaging link 228 are used by the arbiter priority select to monitor the health of buses (208 and 209).

In the event of re-routing and failover, coupled with the data, command and control signals, bus masters from each set 200 and 204 transmit a bus identification code. This identification code represents the bus to which the destined slave is located. For example, bus 209 fails to function, and that a bus master from set 204 is allowed to access the bus 208. Knowing that the set 204 uses a secondary path 234, and that it does not directly owned the bus 208 but only utilizes it due to its bus failure, that bus master from set 204 sends a bus identification code indicating that the data, command and control signal it transmit via bus 208 is intended for slave devices 231 and not for slave devices 230. This bus identification code is received by the slave controller 232 and selects the appropriate slave destination.

Figure 3:
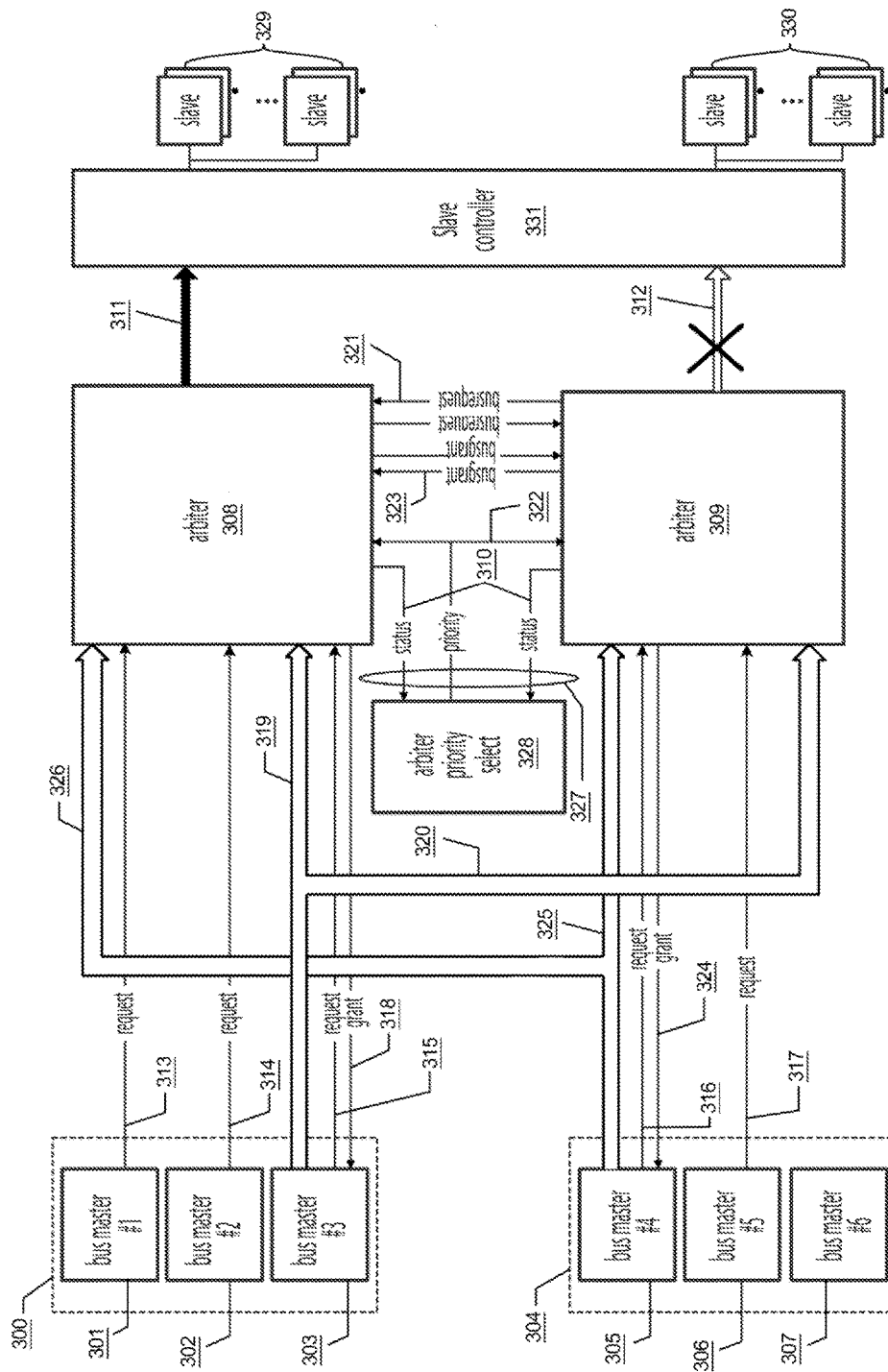
FIG. 3 is a diagram illustrating an example of a system in the event of a bus failure where the failover mechanism functions according to the embodiment of the present invention.

FIG. 3 is a diagram illustrating an example of a system in the event of a bus failure where the failover mechanism functions according to the embodiment of the present invention.

With the architecture and configuration in system 233, the process of failover mechanism is described in detailed wherein: bus masters 301, 302 and 303 from set 300 are actively participating in bus arbitration to transfer data to slave devices 330, bus masters 305 and 306 from set 304 are actively participating in bus arbitration to transfer data to slave devices 331 and bus 312 is detected as malfunctioning.

Arbiter 308 receives the request signals 313, 314 and 315 from the bus masters 301, 302 and 303; concurrently it sends a status signal to the arbiter priority select 328 of the health of bus 311. This status signal 310 informs the arbiter priority select 328 whether the bus 311 is currently functioning or damaged. For this example, bus 311 is in good condition, indicating that the arbiter 308 can grant a bus master with the highest priority from set 300 of bus access and allow transfer of data, command and control signals to the slave devices 329.

At this moment in time, arbiter 309 is receiving request signals 316 and 317 from bus masters 305 and 306 respectively from set 304 requesting for bus access in bus 312. Bus master 307 is shown not participating in the bus arbitration. Detecting that bus 312 is not functioning, arbiter 309 sends a status signal 310 to the arbiter priority select 328 of the health of the bus 312 indicating that it can not perform data transfer.

With the failover mechanism taking place, arbiter 309 still performs arbitration among bus master 305 and 306. In the event where the arbiter 309 has selected a bus master with the highest priority, it sends a busrequest signal 321 to the arbiter 308. The busrequest signal is an indication to the arbiter 308 that a bus master with highest priority from set 304 is requesting to use bus 311. At the same time, arbiter 308 has selected a bus master with highest priority from set 300. With two bus masters determined as high priority, arbiter 308 is handling two high priority requests for bus 311 from both set 300 and 304.

In some embodiment of the present invention, the one of the major function of the arbiter priority select 308 is to choose which high priority request from each set will be serviced first. For this example, since bus 311 is in good condition and that it is primarily owned by set 300, bus master with the highest priority from set 300 will be selected first. Therefore the priority signal 322 of the arbiter priority select will point to arbiter 308 granting the bus master from set 300. Arbiter 308 sends a grant signal 318 to the winning bus master 303. Upon receiving the grant signal 318, the bus master 303 starts to transfer command, control and data information to the target slave device 329 using the primary path 319. Path 320 is disregarded.

Upon completing the bus transaction, the priority signal 322 which previously points to arbiter 308 will point to the busrequest signal 321 from arbiter 309 granting the bus master with the highest priority from set 304. Arbiter 308 will send the busgrant signal 323 indicating that it accepts the requests and will administer the data transfer from set 304. The bus master 305 being the highest priority from set 304 receives a grant signal 324 from arbiter 309. This grant signal 324 is just a reflected busgrant signal 323 from arbiter 308. The bus master 305 then uses the secondary path 326 to transmit command, control and data information in slave device 330 via bus 311. The priority select signal 322 will then shift its priority after a bus transaction has completed.

In some embodiment of the present invention, should there be a plurality of sets connected to the arbiter priority select 328 via the arbiters, the priority signal 322 will point to the bus arbiter that can readily service the busrequest signal 321 from the other sets.

In some embodiment of the present invention the bus identification code is sent together with the control signals indicating the exact bus location of the target slave device. In this example, the bus identification code sent by the bus master 305 from set 304 is directed to the exact location of the slave device 330.

The slave controller 331 will receiving this bus identification code from bus 311 and determines that the command, control and data information is intended for slave device 330 and not for 329. Using certain algorithm it converts the received command, control and data signals from the arbiter 308 to slave specific commands and controls that will allow it to manage the targeted slave device 330.

Figure 4:
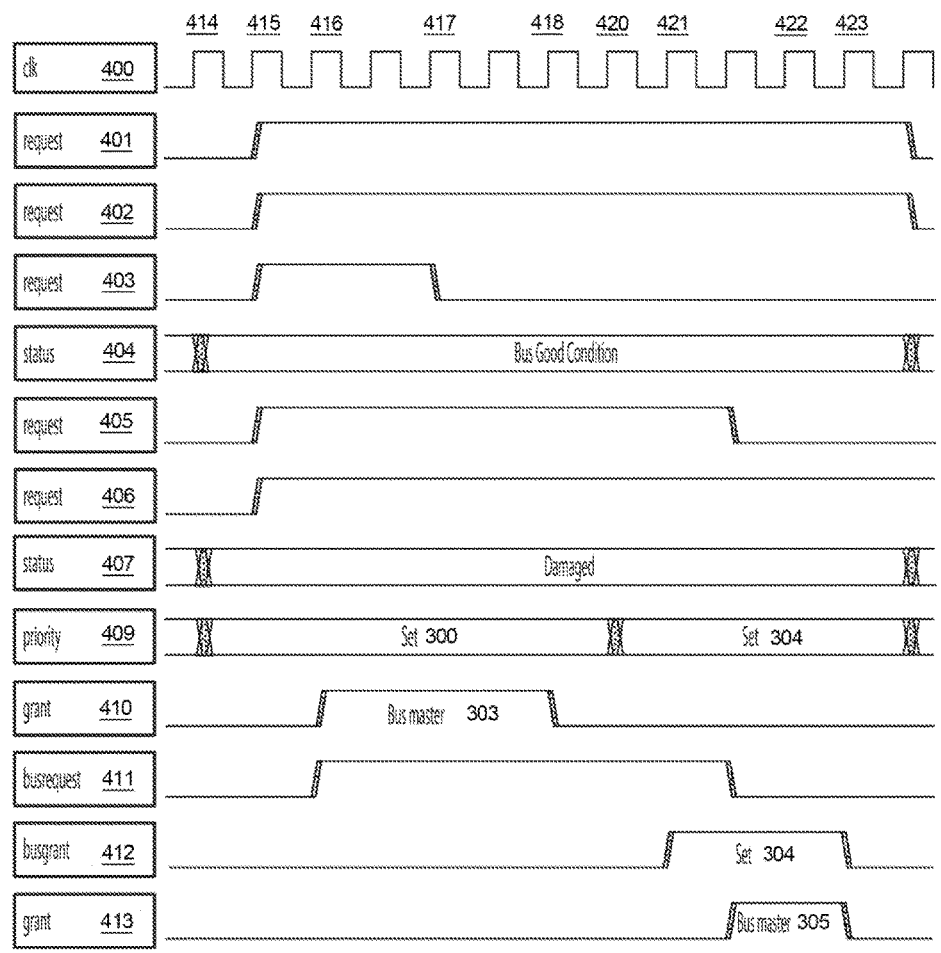
FIG. 4 is a timing diagram illustrating the operation of the system in FIG. 3.

FIG. 4 is a timing diagram illustrating the operation of the system of FIG. 3. Referring to FIGS. 3 and 4, all signals operate in synchronization with the rising edge of a clock signal clk 401 and are active high.

From set 300 of FIG. 3:

Request 401 represents the bus request signal 313 of the bus master 301. Here a data transfer is to be performed using the bus 311 from bus master 301 to a slave device of the slaves 329. Request 402 represents the bus request signal 314 of the bus master 302. Here a data transfer is to be performed using the bus 311 from bus master 302 to a slave device of the slaves 329. Request 403 represents the bus request signal 315 of the bus master 303. Here a data transfer is to be performed using the bus 311 from bus master 303 to a slave device of the slaves 329.

Status 404 represents the status signal 310 of the arbiter 308 to the arbiter priority select 328. Here, the status denotes that the bus 311 driven by the arbiter 308 is in good condition.

From set 304 of FIG. 3:

Request 405 represents the bus request signal 316 of the bus master 305. Here a data transfer is to be performed using the bus 312 from bus master 305 to a slave device of the slaves 330. Request 406 represents the bus request signal 317 of the bus master 306. Here a data transfer is to be performed using the bus 312 from bus master 306 to a slave device of the slaves 330.

Status 407 represents the status signal 310 of the arbiter 309 to the arbiter priority select 328. Here, the status denotes that the bus 312 driven by the arbiter 309 is damaged or unable to perform data transfer.

The priority 409 shown in the timing diagram in FIG. 4 represents the priority signal 310 of the arbiter priority select 328 as input to the arbiters 308 and 309. Here, a prioritization between two sets (300 and 304) is being performed. In the event of a bus failure, the arbiter of the surviving bus will allow only one bus master from each set to access it. In this case, the priority 409 selects between set 300 and 403. It is assumed that at clock signal clk 400, number 414 the priority signal 409 points to set 300.

Grant 410 and grant 413 represent bus grant signals 318 and 324 that are respectively output to the bus masters 303 and 305 by the arbiter 308 and 309.

Busrequest 411 represents the busrequest signal 321 of the arbiter 309 indicating that it is requesting to access bus 311 due to its failed bus 312. The busgrant 412 signal represents the busgrant signal 323 of the arbiter 308 to arbiter 309 indicating that it allows the bus master from set 304 to utilize bus 311.

It is assumed that in set 300, bus master 303 has the highest priority among the other two bus master. In set 304, it is assumed that the priority of the bus master 305 is higher than that of the bus master 306.

At clock signal clk 400 number 414 arbiter 309 detects that the bus 312 is damaged, sending a "damaged" status to arbiter priority select 328. Bus 311 remains to be in good condition causing the arbiter 308 to send "bus good condition" status to arbiter priority select 328.

Each of the bus master 301, 302 and 303 are requesting for the same bus 311. The request signal is triggered at clock signal clk 400 number 415. Similarly bus master 305 and 306 asserted their request for bus 312 at clock signal clk 400 number 415.

At clock signal clk 400, number 416, the priority of the bus master 303 is the highest among the other two bus masters from set 300 and the bus requested by the bus master 303 is bus 311 which is in good condition. Thus, arbiter 308 outputs a bus grant signal grant 410 corresponding to the priority 409 "set 300" of the arbiter priority select 328.

In one embodiment of the present invention, the request signal 403 de-asserts at clock signal clk 400 number 417 after receiving a the grant 410. Note that the grant 410 de-asserts at clock signal clk 400 number 418; here it indicates that the bus transaction or the data transfer executed by the bus master 303 is completed. Improvement was made when the priority signal 322 from arbiter priority select 328 represented by priority 409 shifts its prioritization at clock signal clk 400 number 420 after the bus transaction is completed. This will allow the bus master 303 to continuously perform data transfer without interruption from an external high priority request.

Concurrently, at clock signal clk 400, number 416, arbiter 309 has awarded bus master 305 of the highest priority to access bus 312, however bus 312 is inaccessible. In lieu of this event, arbiter 309 asserts the bus request signal busrequest 411 to arbiter 308 redirecting the request to bus 311 through arbiter 308.

Notice that at the time the busrequest 411 is asserted, the priority 409 transmitted by the arbiter priority select 328 points to set 300. This indicates that the bus transaction (data transfer) conducted by bus master 303 of set 300 is not yet completed and the priority of the operation remains to set 300.

At clock signal clk 400 number 421 the bus master 303 has completed its bus transaction. Arbiter 308 detected a change in the priority signal priority 409 that shifted from set 300 to set 304. At the same time, it is also receiving a bus request signal busrequest 411.

In response to the busrequest 411 sent by the arbiter 309 and with the priority signal priority 409 pointing to set 304, the arbiter 308 grants the request by sending bus grant signal busgrant 412.

Upon receiving bus grant signal busgrant 412, arbiter 309 reflects the grant signal grant 413 at clock signal clk 400 number 422 to the selected bus master with the highest priority from set 304 which is bus master 305.

It is assumed that at clock signal clk 400 number 423, the data transfer of bus master 305 from set 304 using bus 311 has completed resulting a shift in priority.

Figure 5A:
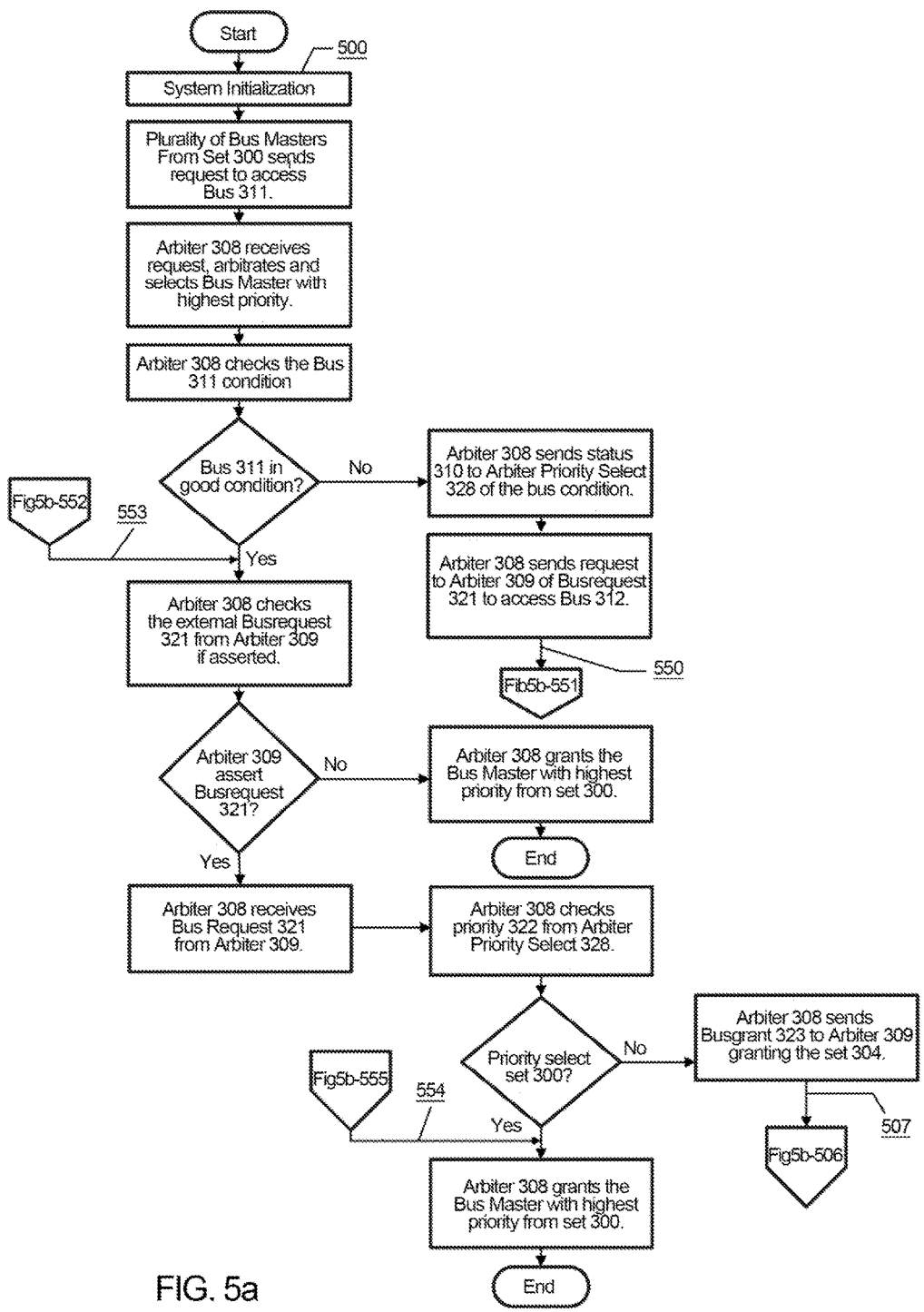
FIGS. 5*a* and 5*b* are flowcharts showing an embodiment of the method performed in the event of a bus failure shown in FIG. 3 according to the embodiment of the present invention.
Figure 5B:
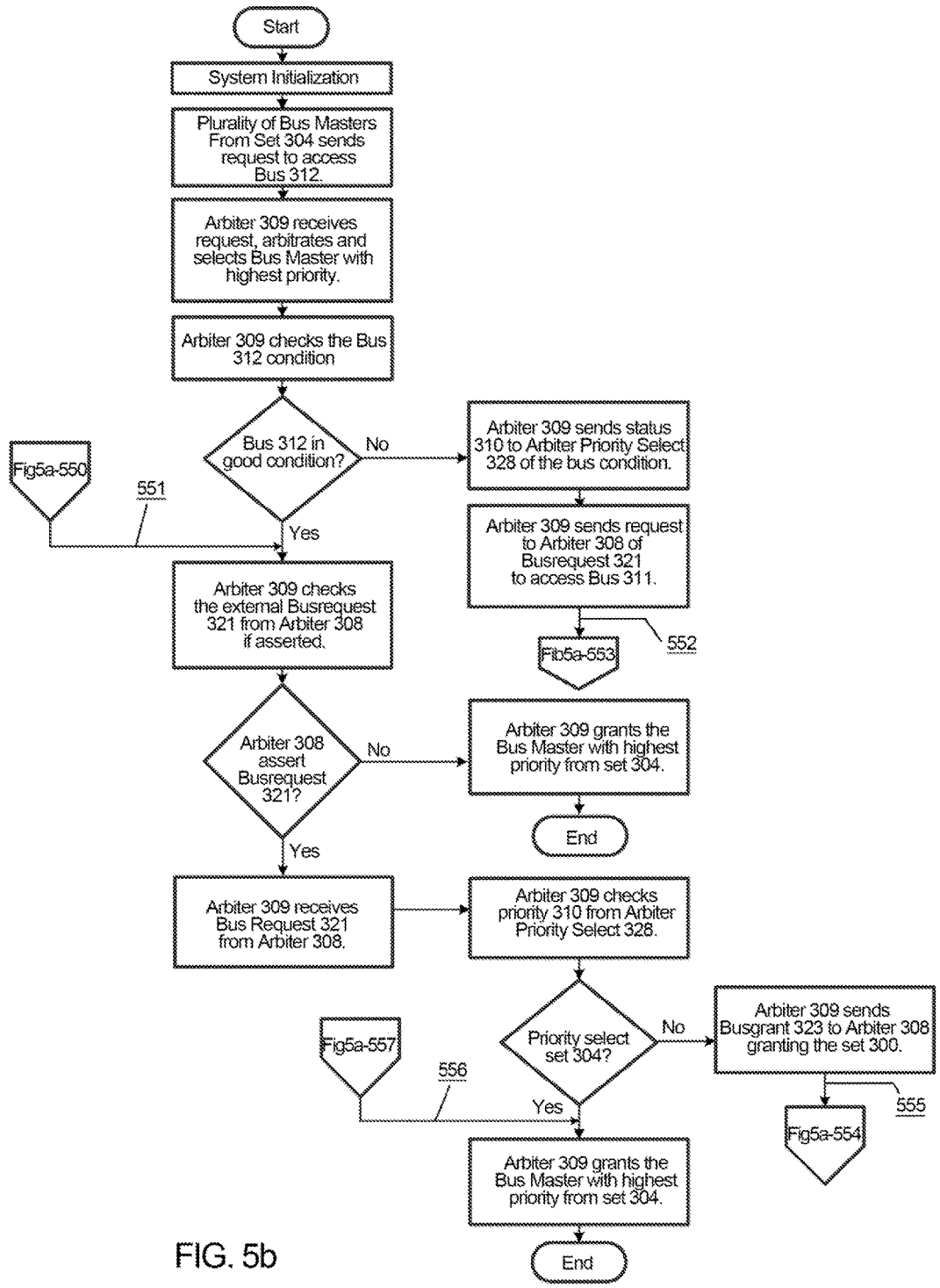

FIGS. 5a and 5b are flowcharts showing an embodiment of the method performed in the event of a bus failure shown in FIG. 3 according to the embodiment of the present invention. FIG. 5a depicts the actions or steps required by arbiter 308 for a failover operation. FIG. 5b depicts the actions or steps required by arbiter 309 for a failover operation. Since both arbiters operate in similar steps and for ease of discussion, in reference to FIG. 3, FIG. 5a is the focus of this discussion.

First, in system initialization step 500, selection and configuration of set 300 is made. Set 300 which is attached to arbiter 308 driving buses 311 is configured to form a cluster and is attached to a central arbiter priority select 328 with set 304 through arbiter 309. Bus 311 is provided with a unique bus identifier that is communicated to the arbiter priority select 328. Detection of bus failure is essential in this step; the arbiter 308 simultaneously sends a status signal 310 to the arbiter priority select 328 indicating the health of bus 311. For the example shown in FIG. 3, bus 311 is in good condition.

FIG. 5A is a start of the regular operation of the arbitration for bus access of set 300. Generally, it involves the request of bus masters 301, 302, and 303 to access bus 311. Bus masters send their request signals 313, 314 and 315 respectively to arbitrate for bus ownership.

FIG. 5A involves the process of a conventional bus arbitration wherein the arbiter 308 selects the bus master with the highest priority. Upon selecting a bus master with the highest priority, the arbiter 308 checks the bus condition 311. In FIG. 5A, the tracking of the health of the bus is done by checking the status signal 310.

In reference to the operation in FIG. 3, the bus 311 is in good condition, which leads to step 5xx wherein arbiter 308 checks the busrequest signal 321. The busrequest signal 321 is an external request coming from another member of the cluster (another set connected to the arbiter priority select 328). In the example shown in FIG. 3, the busrequest 321 indicates that arbiter 309 wishes to access bus 311. In step 5xx, after confirming that a busrequest 321 is asserted by arbiter 309, the next step is for arbiter 308 to check the priority signal 322 transmitted by the arbiter priority select 328.

FIG. 5A involves the granting of the bus master from set 300 of bus 311 access. This resulted to the fact that the priority select signal 322 is pointed towards set 300 through arbiter 308, indicating that the arbiter priority select 328 has awarded set 300 of priority for the ownership of bus 311. Arbiter 308 sends a grant signal 318 to bus master 303 allowing it to perform a bus transaction in bus 311.

In the event that the priority signal is not pointing to set 300 but to set 304, and arbiter 308 sends a busgrant signal 323 to arbiter 309 allowing the bus master selected by arbiter 309 from set 304 to access bus 311.

FIG. 5b is discussed in accordance to the operation of the arbiter 309 shown in FIG. 3 driving a damaged bus 312.

First, in system initialization, selection and configuration of set 304 is made. Set 304 attached to arbiter 309 driving bus 312 is configured to form a cluster and is attached to a central arbiter priority select 328 with set 300 through arbiter 308. Bus 312 is provided with a unique bus identifier that is communicated to the arbiter priority select 328. Detection of bus failure is essential in this step; the arbiter 309 simultaneously sends a status signal 310 to the arbiter priority select 328 indicating the health of bus 312. For the example shown in FIG. 3, bus 312 is detected as a damaged bus.

A start is made of the regular operation of the arbitration for bus access in set 304. Generally, it involves the request of bus masters 305, 306, and 307 to gain ownership of bus 312. In FIG. 3, bus master 307 is not participating in the arbitration. Active bus masters 305 and 306 send their request signals 316 and 317 respectively to arbitrate for bus ownership.

FIG. 5B involves the process of a conventional bus arbitration wherein the arbiter 309 selects the bus master with the highest priority. Upon selecting a bus master with the highest priority, the arbiter 309 checks the bus condition (step 5xx). In FIG. 5B, the tracking of the health of the bus is done by checking the status signal 310.

In reference to the operation in FIG. 3, bus 312 is inaccessible which gives the idea that bus 312 fails to function. This leads to a step wherein arbiter 309 sends a status signal 310 to the arbiter priority select 328 that bus 312 cannot be used. The asserting of this status signal 310 enables the arbiter priority select 328 to transmit a priority signal 322 between two sets 300 and 304 selecting one set at a time to access the surviving bus 311.

In FIG. 5b, arbiter 309 sends a busrequest signal 321 to arbiter 308 that it would like to access bus 311. The next action to take place is in FIG. 5a wherein in step 5xx, the arbiter 308 detected an external busrequest 321 from arbiter 309.

From FIG. 5a, when the arbiter grants the request of arbiter 309 by sending busgrant 323 due to the shift of priority from set 300 to 304. Note that the change of priority takes place after the bus transaction of bus master 303 from set 300 is completed. FIG. 5b involves the process wherein arbiter 309 receives the bugrant 323 from arbiter 308. Arbiter 309 reflects this grant signal to the bus master with the highest priority from set 304 which is bus master 305 by sending a grant signal 324.

Figure 6:
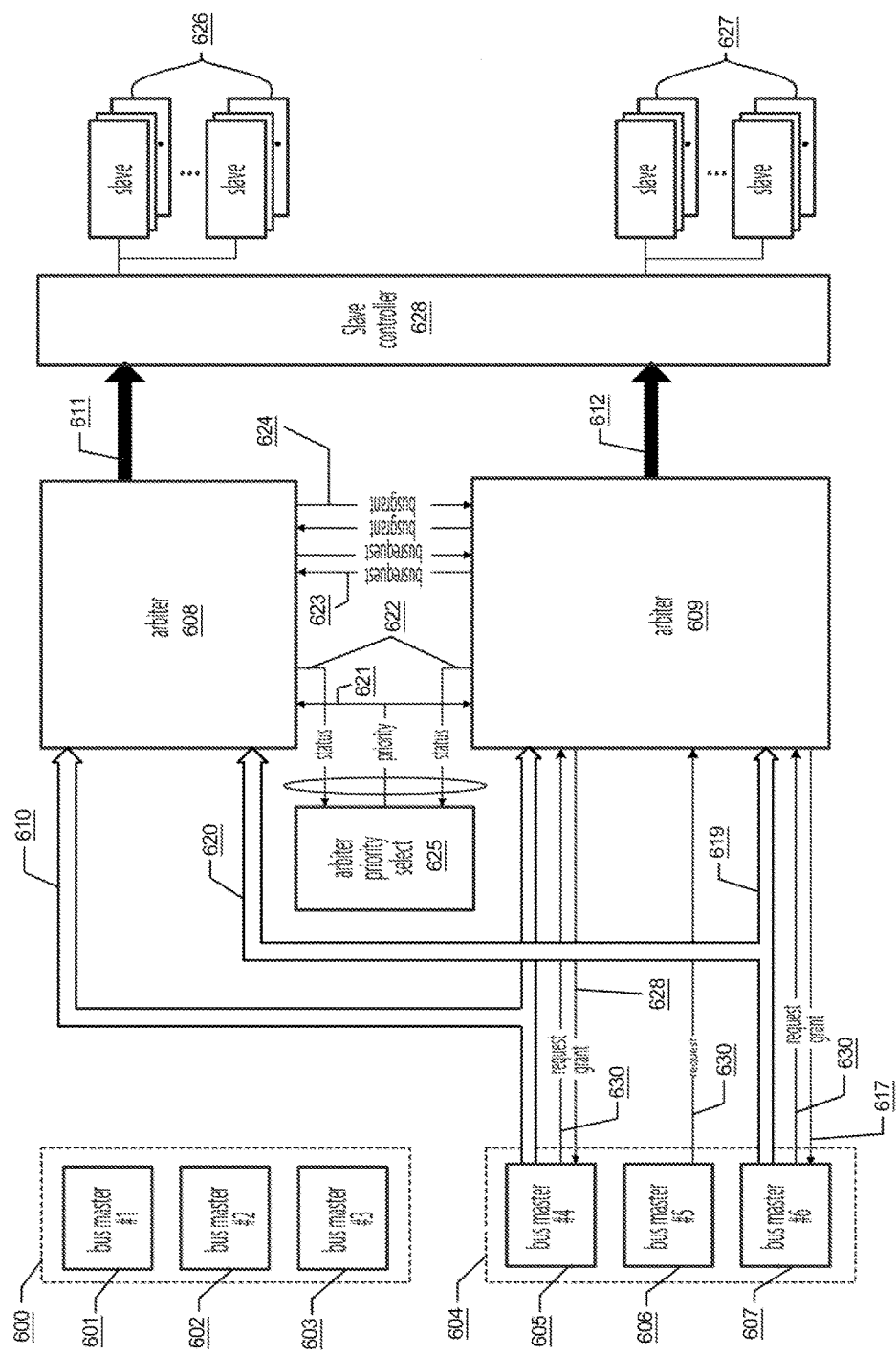
FIG. 6 is a diagram illustrating an example of a system performing bus re-routing according to the embodiment of the present invention.

FIG. 6 is a diagram illustrating an example of a system performing bus re-routing according to the embodiment of the present invention.

The bus re-routing scenario of the invention is similar to the algorithm of the failover mechanism except that the busses involved in the system 233 are all functioning and the bus(es) that are free of any transaction will be utilized by other requesting bus masters.

In the light of this discussion, the system 233 in FIG. 2 is adapted, together with its selection of sets and configuration wherein: a set 600 of bus masters (601, 602 and 603) are attached to an arbiter 608, which drives the bus 611; a second set 604 of bus masters (605, 606 and 607) are attached to a second arbiter 609 which drives the 612 bus; sets 600 and 604 are attached to a central arbiter priority select 625 through the arbiters 608 and 609; no detection of bus failure in both bus (611 and 612); slaves 626 are owned by the bus masters in set 600 while slaves 627 are owned by the bus masters in set 604.

Shown in the figure are two sets (600 and 604) of bus masters. Bus masters from set 600 are in-active, meaning, none of the bus masters from the set 600 are requesting for bus 611 access. Meanwhile, bus masters from set 604 are asserting their request 630 signal line indicating that they are requesting to access bus 612 to transfer data, command and control signals to the intended slave device 627.

With both buses in good condition, the arbiters 608 and 609 are sending status information to the arbiter priority select 625 of the health of the buses 611 and 612 respectively using the status signal 621.

In one embodiment of the present invention wherein a bus is free due to inactive bus request from bus masters attached to it, the arbiter that grants the access to the bus can accept external bus request from foreign sets of bus masters that are attached to the arbiter priority select. Wherein for the figure shown, since arbiters 608 and 609 are configured to connect in one arbiter priority select 625, therefore arbiter 608 having the bus 611 attached to it as a free bus, can accept bus request from arbiter 609 to utilize the bus 611.

In the example shown below, receiving as input from bus masters 605, 606 and 607, arbiter 609 performs an arbitration method that selects the highest priority request among the bus masters requesting from set 604. The first part of arbitration resulted for the arbiter 609 to award bus master 607 as the highest priority. Arbiter 609 sends a grant signal 617 to bus master 607 indicating that it can now perform data transfer to slave(s) 627 using bus 612. Bus master 607 uses path 619 as its primary data and command/controls path. It should be noted that in the span of the data transfer of the bus master 607, the ownership of bus 612 remains with the bus master 607 until the bus transaction is complete.

The slave controller 628 which is attached to the buses 611 and 612 receives the command and control signals from the bus master 607. It converts the signals received into slave specific commands in order to take control of the intended slave devices. Using the bus identification code sent by the bus master 607 is read by the slave controller allowing it to direct the slave specific command and control signals together with the data information to the intended slave destination in slaves 627. Take note that the secondary path 620 is disregarded.

While bus master 607 is performing data transfer using bus 612, bus masters 605 and 606 continues to request 630 for bus access. Note in this example, the bus masters from set 600 remains in-active.

In the event that bus 612 in the possession of bus master 607 and that there are pending requests 630 from bus masters 605 and 606, arbiter 609 sends a busrequest 623 signal to arbiter 608. The busrequest signal 623 is an indication that there are active requests from set 604 that can not be serviced for the moment by the bus 612. The arbiter 609 performs a multi-level priority arbitration (hidden arbitration) that selects a second bus master with the highest priority from the set 604.

The arbiter priority select 625 receiving a status 622 signal from arbiter 608 that the bus 611 is free triggers priority signal 621 selecting which set (600 or 604) is to be serviced by bus 611. Note that if the status signal 622 of the arbiter 608 denotes a "free bus" it automatically indicates that there are active requests from bus masters in set 600.

Upon receiving the busrequest signal 623 from arbiter 609, the arbiter 608 checks the priority signal 621 from arbiter priority select 625. At this certain point in time, since the status signal 622 received by the arbiter priority select 625 from 608 is a free bus, the priority signal 621 will point to the other set requesting access to the bus 611 via arbiter 608 which in this case, the priority signal 621 points to the set 604.

The arbiter 608 will grant the request from arbiter 609 by sending a busgrant 624 signal. This busgrant 624 signal from arbiter 608 will be reflected to bus master 605 via arbiter 609.

Upon receiving the grant signal 628 from arbiter 609, bus master 605 performs a data transfer to the intended slave of slave devices 627 using the path 610. The arbiter 608 having granted the request of bus master 605 via arbiter 609 will process the bus transaction of bus master 605 by sending the data, command and control signals of the bus master 605 to the slave controller 628 using the bus 611.

Receiving the data, command and control signals include the bus identification code sent by the bus master 605. This identification code specifies the intended destination of the data, command and control information transmitted by the bus master 605. Since the information was re-routed due to inactive bus 611, the bus identification code will made it possible for the slave controller 628 to identify which slave devices (626 or 627) the information is for. For this example, the bus identification code will denote that the information sent is for the slave devices 627. Note that specific address of the slave device is also contained in the control signals.

Should there be a case that the bus masters from set 600 are requesting, that the busrequest signal 623 from arbiter 609 is asserted, the priority signal 621 will shift its priority from one arbiter to another allowing only one bus master from each set (600 or 604) to gain access of bus 611 at a time. In the same manner, when the busrequest signal 623 from arbiter 608 is asserted, the priority signal 621 from arbiter priority select 625 will shift from one arbiter to another allowing only one bus master from each set (600 or 604) to gain access of bus 612 at a time.

Figure 7:
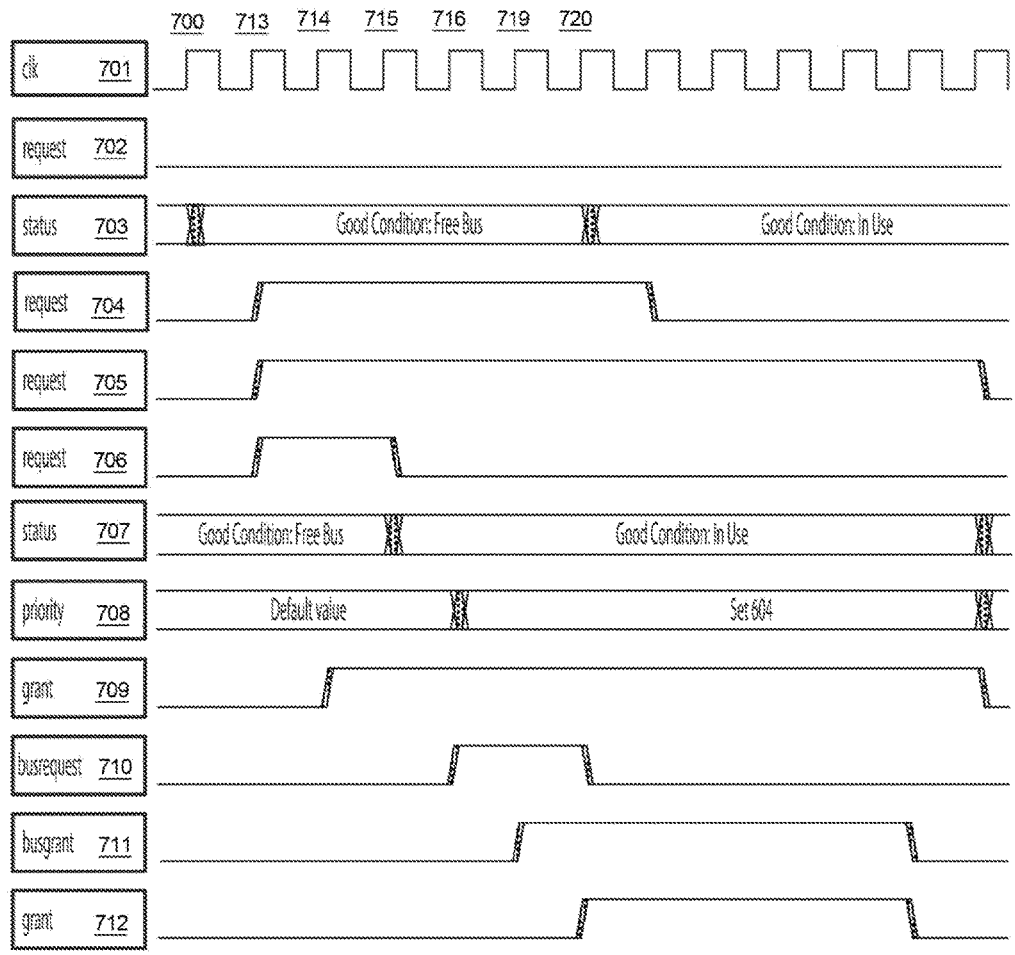
FIG. 7 is a timing diagram illustrating the operation of bus re-routing in FIG. 6.

FIG. 7 is a timing diagram illustrating the operation of bus re-routing of FIG. 6. Referring to FIGS. 6 and 7, all signals operate in synchronization with the rising edge of a clock signal clk 701 and are active high.

From set 600 of FIG. 6:

Request 402 represents the bus request of the bus masters 601, 602 and 603. Here the request signal 702 is not active due to the fact that none of the bus masters from set 600 wishes to own the bus 611.

Status 703 represents the status signal 622 of the arbiter 608 to the arbiter priority select 625. Here, the status denotes that the bus 611 driven by the arbiter 608 is in good condition and is not used by any bus masters from set 600.

From set 604 of FIG. 6:

Request 704 represents the bus request signal 630 of the bus master 605. Here a data transfer is to be performed using the bus 612 from bus master 605 to a slave device of the slaves 627. Request 705 represents the bus request signal 630 of the bus master 606. Here a data transfer is to be performed using the bus 612 from bus master 606 to a slave device of the slaves 627. Request 706 represents the bus request signal 630 of the bus master 607. Here a data transfer is to be performed using the bus 612 from bus master 607 to a slave device of the slaves 627.

Status 707 represents the status signal 622 of the arbiter 609 to the arbiter priority select 625. Here, the status denotes that the bus 612 driven by the arbiter 609 is in good condition.

The priority 708 shown in the timing diagram in FIG. 7 represents the priority signal 621 of the arbiter priority select 625 as input to the arbiters 608 and 609. Here, a prioritization between two sets (600 and 604) is being performed. In the event of a bus request re-routing, only one bus master from each set can own the bus.

Grant 709 and grant 712 represent bus grant signals 617 and 628 that are respectively output to the bus masters 607 and 605 by the arbiter 609.

Busrequest 710 represents the busrequest signal 624 of the arbiter 609 indicating that it is requesting to access bus 611 for bus utilization. The busgrant 711 signal represents the busgrant signal 623 of the arbiter 608 to arbiter 609 indicating that it allows the bus master from set 604 to utilize bus 611.

It is assumed that in set 604, bus master 605 has the highest priority among the other two bus masters.

At clock signal clk 701 number 700 arbiter 608 detects that the bus 611 that the bus masters from set 600 are not active. With this, the arbiter 608 sends a status signal status 703 to arbiter priority select 625 that the bus 611 is free and not being used. Similarly, arbiter 609 sends a status signal status 707 indicating that the bus 612 is free.

However, at clock signal clk 701 number 713 arbiter 609 receives request signals request 704, 705 and 706 from bus masters 605, 606 and 607. Each of the bus masters are requesting for the same bus 612.

At clock signal clk 701, number 714, the priority of the bus master 607 is the highest among the other two bus masters from set 604 and the bus requested by the bus master is in good condition and free to use. Thus, arbiter 609 outputs a bus grant signal grant 709. In effect, at clock signal clk 701 number 715 arbiter 609 changes its status signal status 707 to an "in use" bus 612. At the same time, bus master 607 de-asserts the request signal request 704 after receiving the grant signal grant 709.

At clock signal clk 701 number 716, request signals from set 604 continues to assert, which results to arbiter 609 asserting a bus request signal busrequest 710. The signal is sent to arbiter 608 to service. At the time, arbiter priority select 625 detected that the status signal status 707 transmitted by arbiter 609 changed to "in use", from its default/current value, the priority changes from the current value to the set 604. This denotes that since bus 604 is already in use, and that the status signal status 703 of arbiter 608 is "free bus" the priority is directed to the bus masters of set 604 that continuously request for a bus access.

With the priority in set 604, and that the bus masters are continuously requesting to access a bus, arbiter 608 sends a bus grant signal busgrant 711 to arbiter 609. the arbiter 608 will then change its status from "free bus" to "in use bus". Upon receiving the signal, arbiter 609 sends a local grant signal grant 712 to the bus master with the second highest priority which in this case is the bus master 605.

Figure 8A:
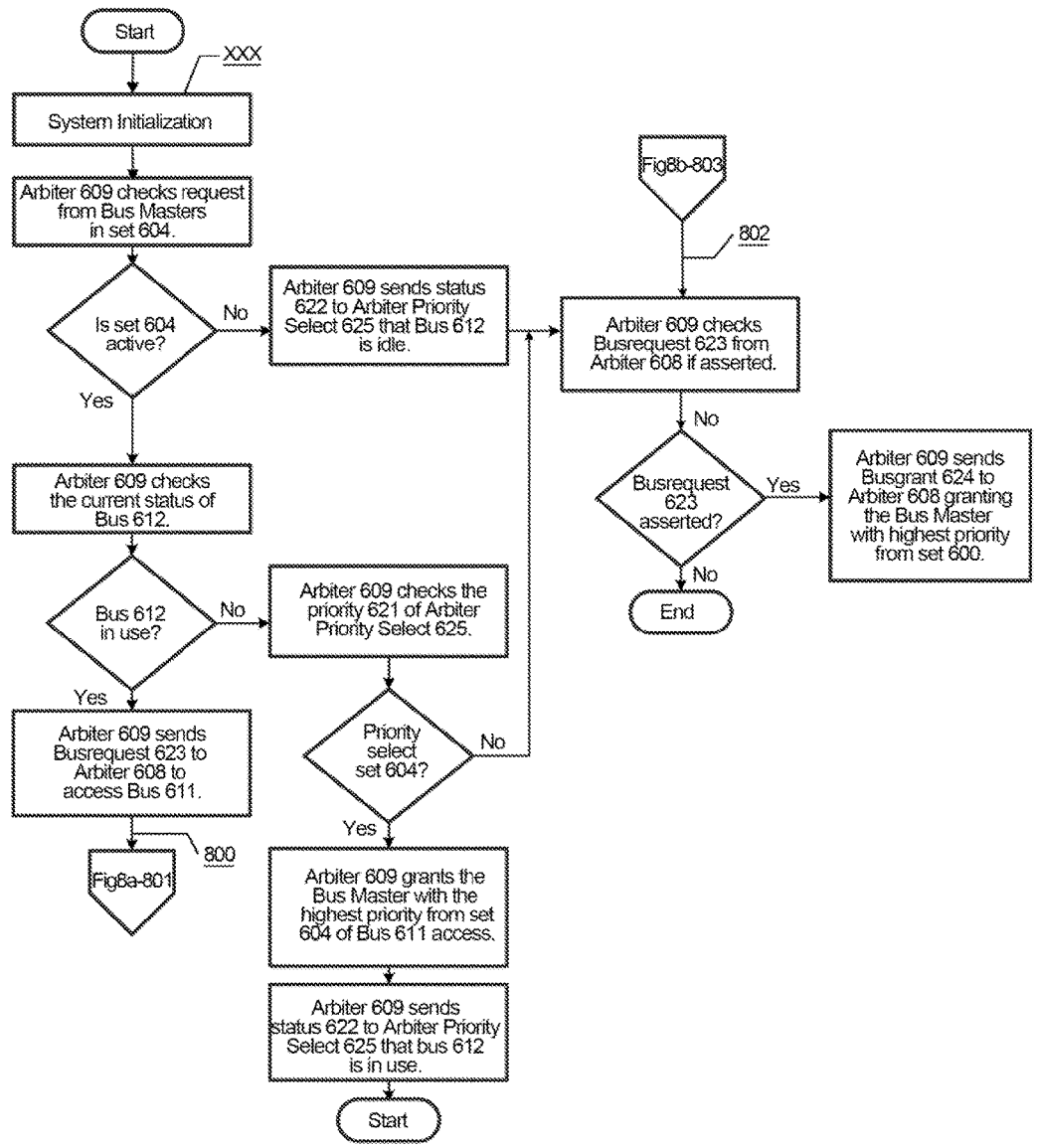
FIGS. 8*a* and 8*b* are flowcharts showing an embodiment of the method performed in the event of bus re-routing shown in FIG. 6 according to the embodiment of the present invention.
Figure 8B:
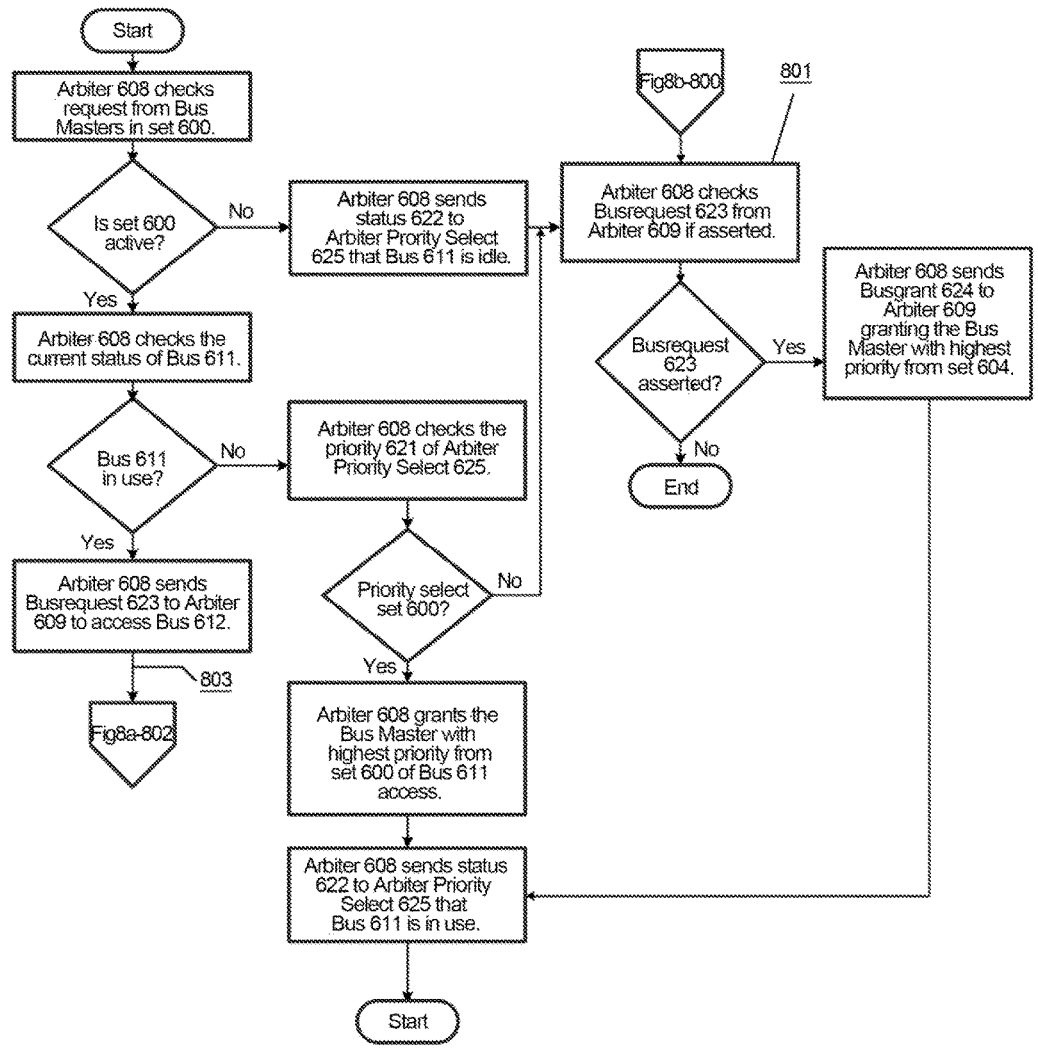

FIGS. 8a and 8b are flowcharts showing an embodiment of the method performed in the event of bus re-routing shown in FIG. 6 according to the embodiment of the present invention.

FIG. 8a depicts the actions or steps required by arbiter 609 to perform bus re-routing procedure. FIG. 8b depicts the actions or steps required by arbiter 608 to perform bus re-routing procedure. Since both arbiters operate in similar steps and for ease of discussion, in reference to FIG. 6, FIG. 8a is the focus of this discussion.

First, in system initialization step xxx, selection and configuration of set 604 is made. Set 604 which is attached to arbiter 609 driving bus 612 is configured to form a cluster and is attached to a central arbiter priority select 625 with set 600 through arbiter 608. Bus 612 is provided with a unique bus identifier that is communicated to the arbiter priority select 625. Detection of bus failure is essential in this step; the arbiter 609 simultaneously sends a status signal 622 to the arbiter priority select 625 indicating the health of the bus 612. For the example shown in FIG. 6, bus 311 is in good condition.

FIG. 8a starts the regular operation of the arbitration for bus access of set 604. Generally, it involves the launching of bus request from bus masters of set 604. Bus masters 605, 606 and 607 sends their request signals 630 to arbitrate for bus ownership. Before granting any bus master of bus access, arbiter 609 checks the status signal 622 of bus 612. Based on the example shown in FIG. 6, bus 612 is currently not in use. This leads the arbiter 609 to check the priority signal 621 transmitted by the arbiter priority select 625. It is also assumed that arbiter 609 has awarded bus master 607 of the highest priority to access the bus.

In FIG. 6, it is assumed that the default priority of the arbiter priority select 625 points to set 604. This leads to step 8xx, here the arbiter 609 grants the bus master 605 of bus 612 access.

Upon granting the bus master 605, arbiter 609 changes its status signal 622 from "free bus" to "in use bus". This signaling denotes that the bus 612 is busy and can't be accessed by any bus master requesting from set 604 or set 600.

Assuming that for certain time, the operation repeats but this time, the bus 612 is in use. Once a busy bus is detected, and so as the congestion of bus request, bus re-routing is performed.

When the bus 612 is busy, the arbiter 609 sends a bus request signal busrequest 623 to arbiter 608 to requesting to access bus 611. From this step, the next procedure occurs in the operation of arbiter 608 shown in FIG. 8b.

Basing from FIG. 6, arbiter 608 operates in similar action as that of the previously discussed operation of arbiter 609 (FIG. 8a). After the step 8xx of initialization, the arbiter 608 checks for any bus request from bus masters of set 600. from the example shown in FIG. 6, none of the bus masters are active at the moment, which results to the arbiter 608 sending a status signal 622 indicating that the bus 611 is idle or not in use.

FIG. 8A involves the checking of the arbiter 608 of any external bus request signal. In this case, from FIG. 8a, the arbiter 608 receives a busrequest 623 from arbiter 609 requesting to access the bus 611.

Since none of the bus master from set 600 is requesting to access bus 611, arbiter 608 allows the set 604 to utilize its bus, therefore it grants the request of arbiter 609 by sending busgrant 624. Upon receiving busgrant 624, arbiter 609 sends a local grant signal to the next bus master with the highest priority which is bus master 605.

The arbiter 607 changes its status signal 622 indicating that the bus 611 is currently in use. The status is sent to the arbiter priority select 625.

Figure 9:
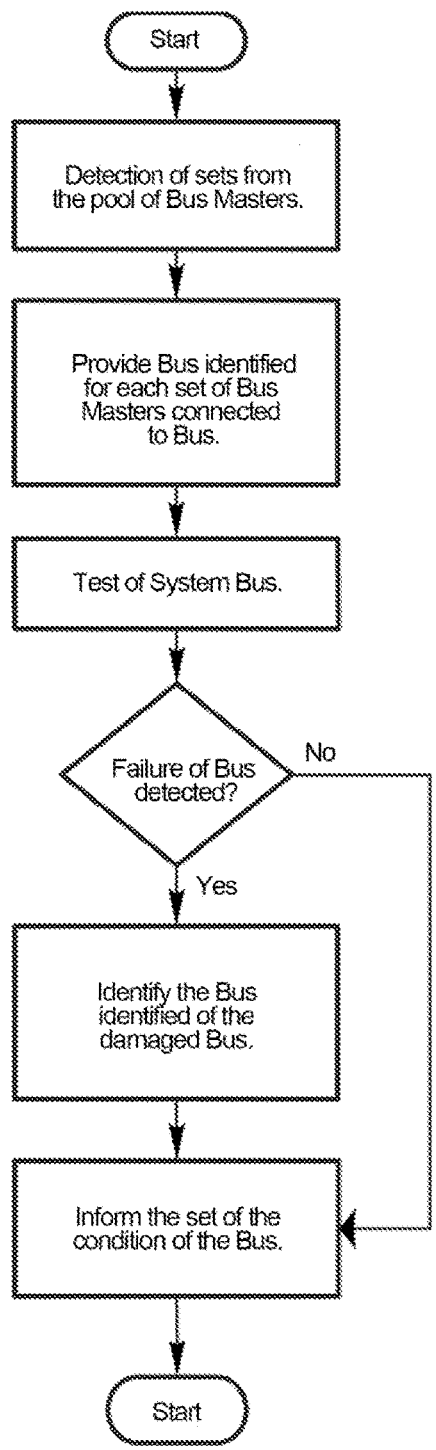
FIGS. 9 and 10 are additional flowcharts of methods in accordance with embodiments of the invention.

FIG. 9 is a flowchart of a method with the following operations, in accordance with an embodiment of the invention. First, the method performs detection of sets from the pool of bus masters. Next, the method provides a bus identified for each set of bus maters connected to the bus. Next, the method performs test of the system bus. Next, the method can determine if a failure of bus is detected. If there is no failure, the method informs the set of the condition of the bus. If there is a failure, the method will identify the bus as a damaged bus and the method then informs the set of the condition of the bus. The method starts again.

Figure 10:
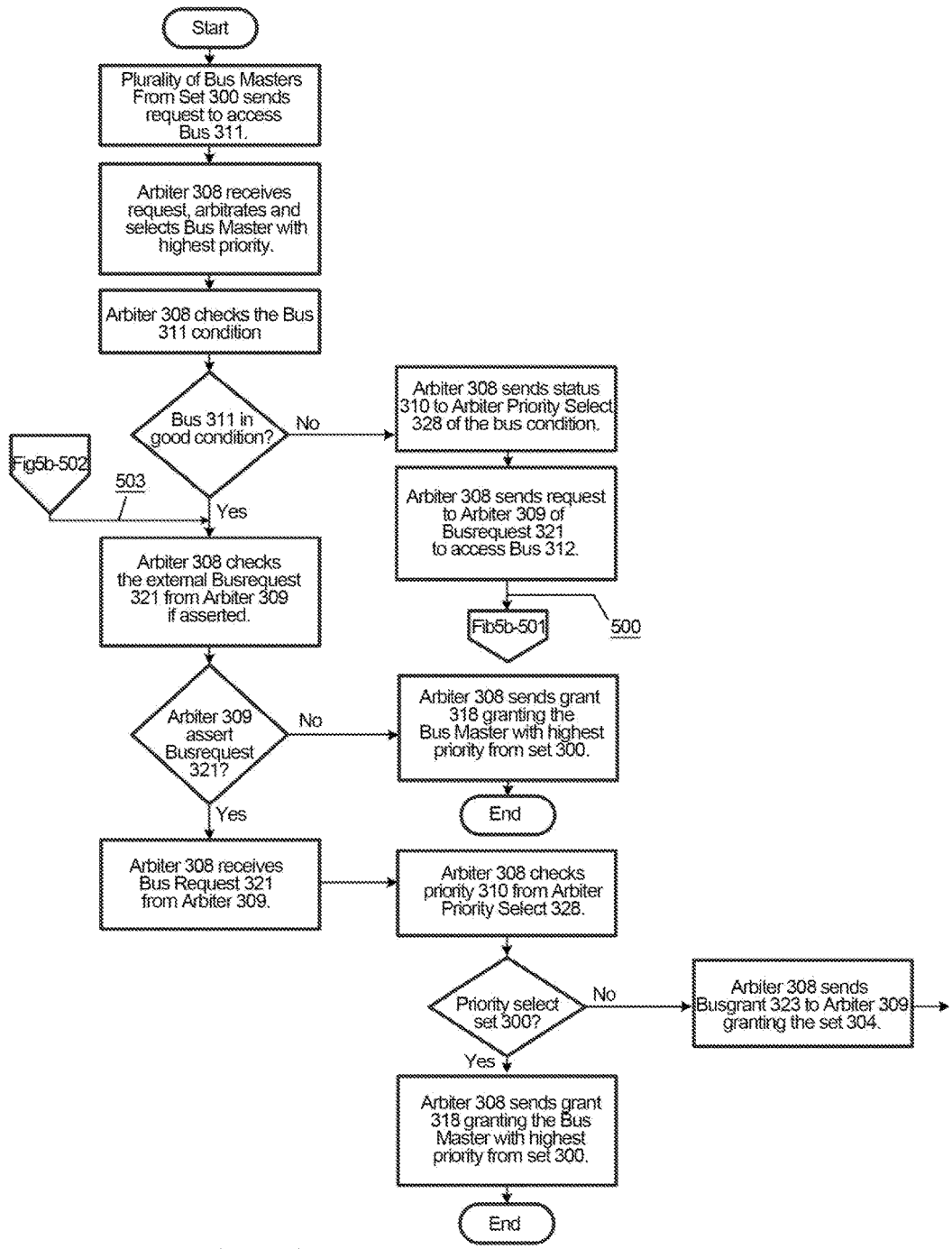

FIG. 10 is a flowchart of a method with the following operations, in accordance with an embodiment of the invention. First, in the method, a plurality of bus masters from the set 300 sends a request to access bus 311. Next, arbiter 308 receives the request and arbitrates and selects the bus master with the highest priority. Next, arbiter 308 checks the bus 311 condition. If the bus is in good condition, the arbiter 308 checks the external busrequest 321 from arbiter 309 if asserted and checks if the arbiter 309 asserts busrequest 321 and if asserted (block 502 for FIG. 5B is also input (503) in this operation, the arbiter 308 receives bus request 3021 from arbiter 309, and if not asserted, the arbiter 308 sends grant 318 granting the bus master with the highest priority form set 300 and the method then ends.

In the method, if bus 311 is not in good condition, the arbiter 308 sends status 310 to arbiter priority select 328 of the bus condition and arbiter 308 sends the request to arbiter 309 of busrequest 321 to access bus 312 and the method proceeds to block 501 in FIG. 5B.

In the method, if the arbiter 309 does not assert the busrequest 321, the arbiter 308 sends grant 318 granting the bus mater with the highest priority from set 300 and the method then ends.

After the arbiter 308 receives busrequest 321 from arbiter 309, then arbiter checks the priority 310 from arbiter priority select 328. If the priority select is set 300, then the arbiter 308 sends busgrant 323 to arbiter 309 granting the set 304. If the priority select is not set 300, then arbiter 308 sends grant 318 granting the bus master with the highest priority from set 300, and the method then ends.

Figure 11:
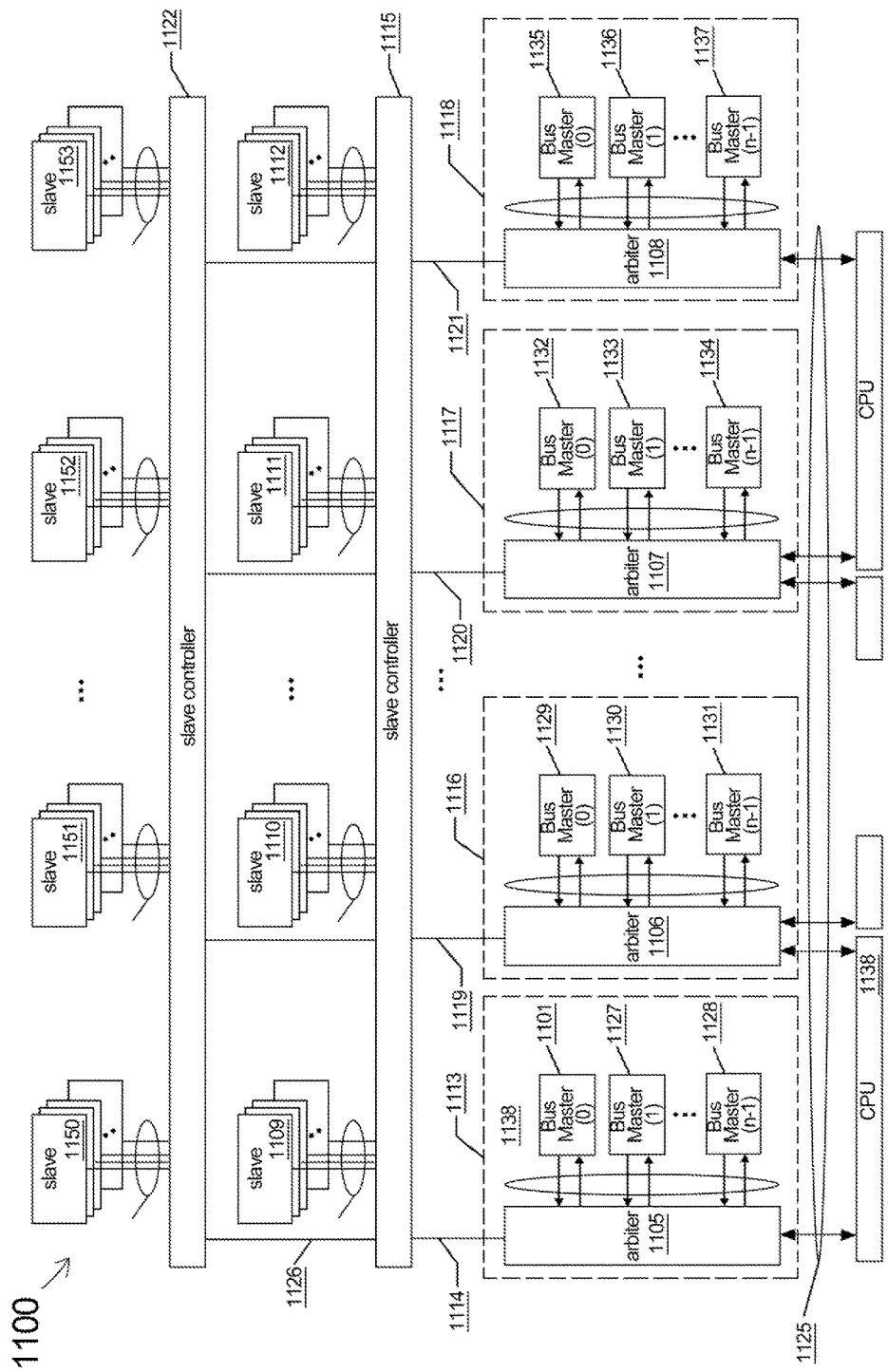
FIG. 11 is a diagram illustrating an embodiment of a system comprising of a plurality of bus masters driving the system buses, with bus arbiters, slave controllers and slave devices according to another embodiment of the present invention.

FIG. 11 is a diagram illustrating an embodiment of a system 1100 comprising of a plurality of bus masters driving the system buses, with bus arbiters, slave controllers and slave devices according to another embodiment of the present invention. Components in FIG. 11 that are similarly shown in FIG. 1 and/or other drawings will have the same or similar functionalities as described above and will not be repeated for purposes of brevity.

In an embodiment of the invention as shown in FIG. 11, a CPU 1138 is coupled to the arbiters 1105 and 1106. Another CPU may be coupled to the arbiters 1107 and 1108. In another embodiment of the invention, each CPU is only coupled to an arbiter instead of the CPU being coupled to a plurality of arbiters. Each CPU manages corresponding arbiters and sets 1113 and 1116 or sets 117 and 1118. Each CPU will execute a firmware that chooses bus re-routing and failover in the event of a bus failure and/or bus routing and bus redundancy for controls and data transfers in cases of unused, idle or inactive buses, as similarly described above with reference to FIG. 1. The firmware notifies and manages the arbiters when routing and bus failover are performed as similarly described above.

In one embodiment of the invention, the distributed bus 126 of FIG. 1 may be used to connect the slave controllers 115, 122, 123, and 124 (FIG. 1) to the arbiters 1105, 1106, 1107, and 1108 as described above. In another embodiment of the invention, serial flashbus 1114 and 1126 connect the slave controllers 1115 and 1122 to the arbiters 1105, 1106, 1107 and 1108. Slave controller 1115 is connected to the one or more slaves 1109, one or more slaves 1110, one or more slaves 1111, and/or one or more slaves 1112. Slave controller 1122 is connected to the one or more slaves 1150, one or more slaves 1151, one or more slaves 1152, and/or one or more slaves 1113.

The serial flashbus 1114 and 1126 are connected based on a point-to-point flashbus topology that is described in, for example, commonly-owned and commonly-assigned U.S. patent application Ser. No. 14/217,161 which is hereby fully incorporated herein by reference.

Figure 12:
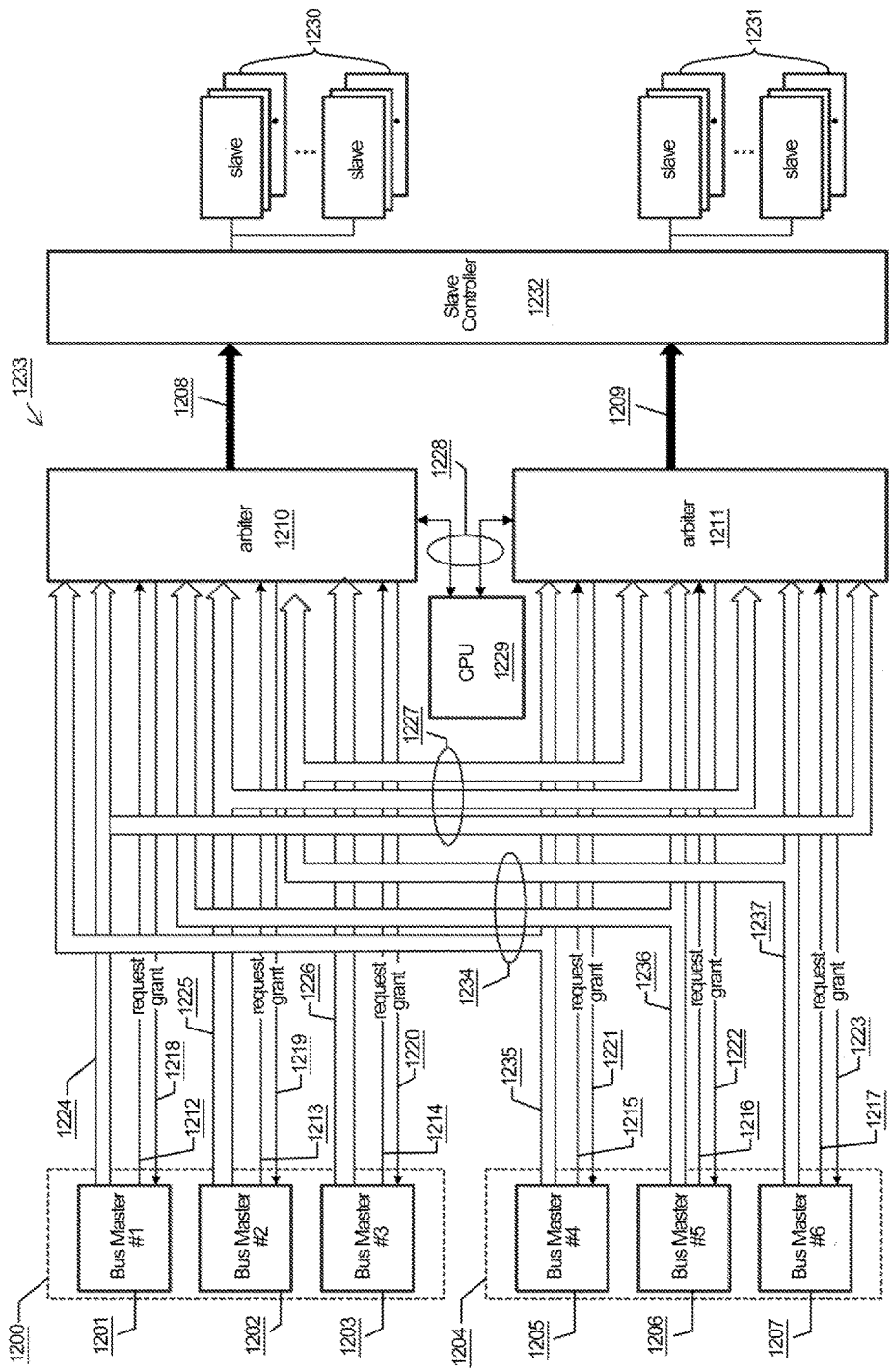
FIG. 12 is a diagram illustrating an example of another embodiment of the present invention.

FIG. 12 is a diagram illustrating an example of another embodiment of the present invention. Components in FIG. 12 that are similarly shown in FIG. 2 and/or other drawings will have the same or similar functionalities as described above and will not be repeated for purposes of brevity.

A CPU 1229 is coupled to and communicates with the arbiters 1210 and 1211 instead of an arbiter priority selected 229 of FIG. 2. In an embodiment of the invention, arbiters 1210 and 1211 do not communicate with each other, and the CPU 1229 obtains information from the arbiters 1210 and 1211 and commands the arbiters 1210 and 1215 what to do via the link 1228, for example, during the process of arbitration in the event of re-routing and failover. The CPU 1229 monitors the health, failure, and/or status of the buses 1208 and 1209 via the arbiters 1210 and 1211, respectively. The CPU 1229 also selects the priority between the bus 1208 and bus 1209. The CPU 1229 performs the above functions by execution of firmware. Other operations during the event of re-routing and failover between bus 1208 and bus 1209 are similarly described above with reference to FIG. 2.

Figure 13:
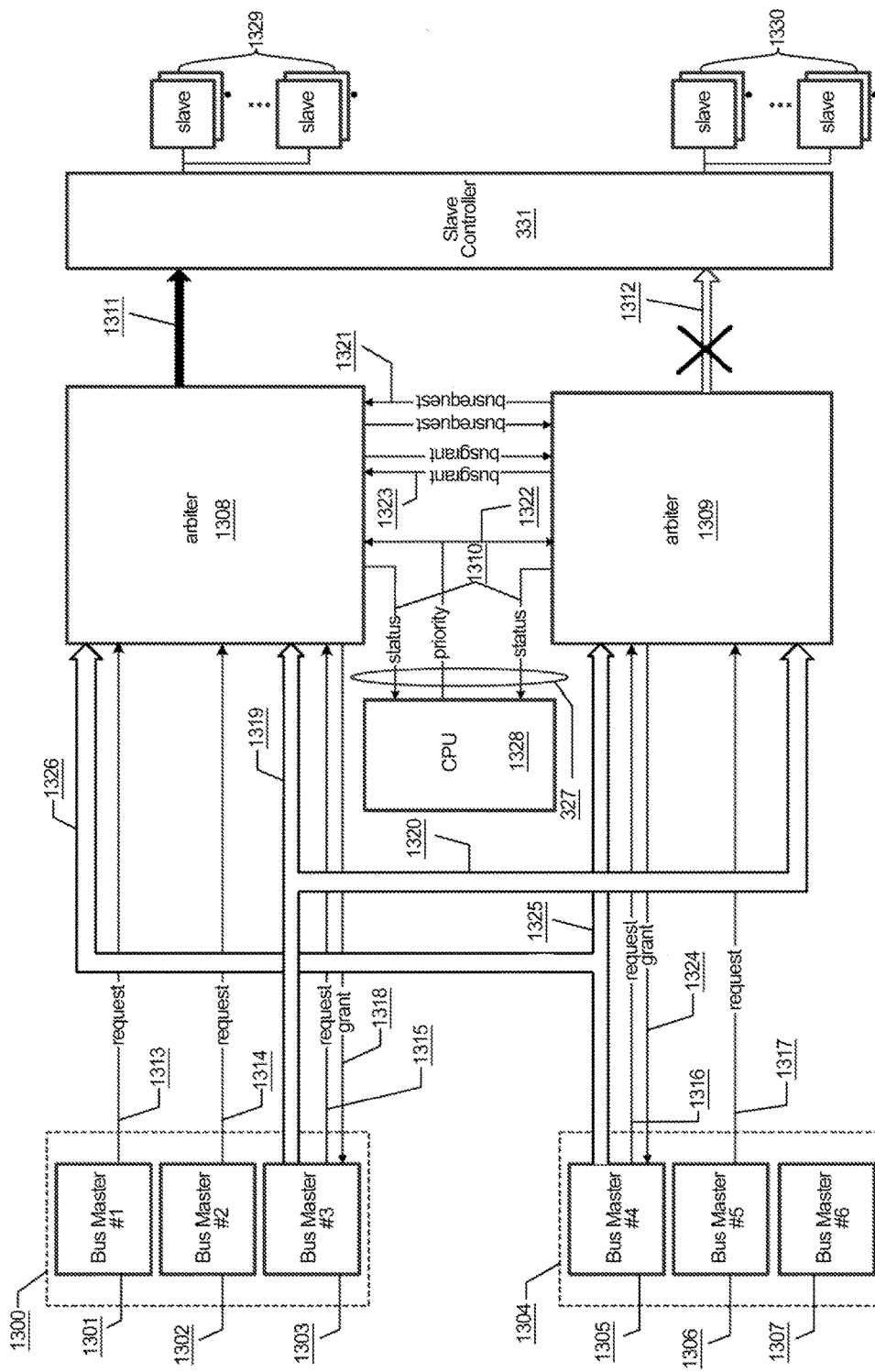
FIG. 13 is a diagram illustrating an example of a system in the event of a bus failure where the failover mechanism functions according to another embodiment of the present invention.

FIG. 13 is a diagram illustrating an example of a system in the event of a bus failure where the failover mechanism functions according to another embodiment of the present invention. Components in FIG. 13 that are similarly shown in FIG. 3 and/or other drawings will have the same or similar functionalities as described above and will not be repeated for purposes of brevity.

A CPU 1328 is coupled to and communicates with the arbiters 1308 and 1309 instead of an arbiter priority selected 328 of FIG. 3. In an embodiment of the invention, arbiters 1308 and 1309 can communicate with each other to a limited extent, and the CPU 1328 obtains information from the arbiters 1308 and 1309 and commands the arbiters 1308 and 1309 what to do via the link 1327, for example, during the process of arbitration in the event of re-routing and failover. The CPU 1328 monitors the health, failure, and/or status of the buses 1311 and 1312 via the arbiters 1308 and 1309, respectively. The CPU 1310 also selects the priority between the bus 1311 and bus 1312 via signal 1322. The CPU 1229 performs the above functions by execution of firmware. Other operations during the event of re-routing and failover between bus 1311 and bus 1312 are similarly described above with reference to FIG. 3. However, the arbiters 1308 and 1309 includes additional intelligence because the arbiters 1308 and 1309 can send bus requests signals 1321 to each other and send bus grant signals 1323 to each other, as similarly described above with reference to FIG. 3.

Figure 14:
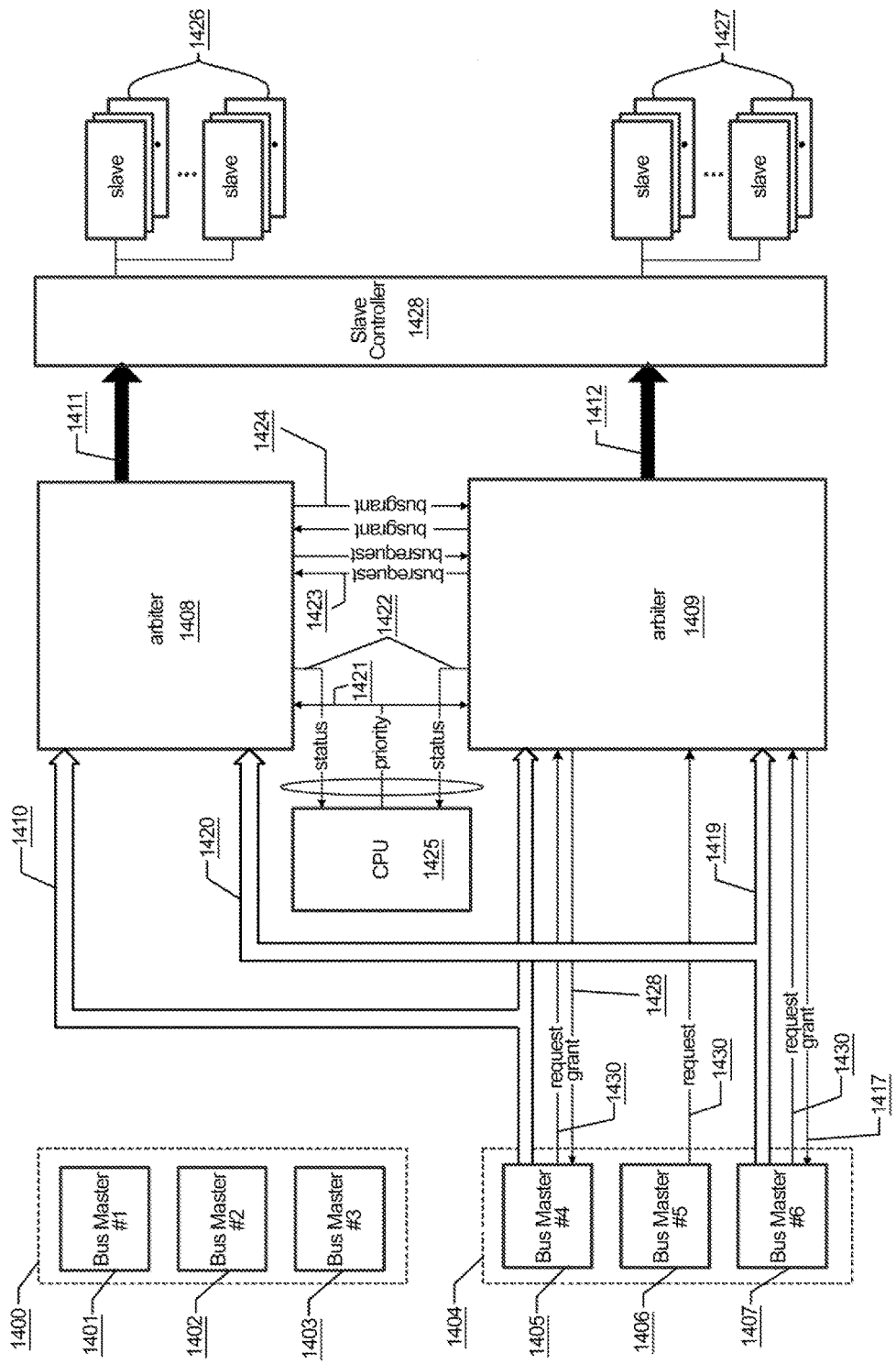
FIG. 14 is a diagram illustrating an example of a system performing bus re-routing according to another embodiment of the present invention.

FIG. 14 is a diagram illustrating an example of a system performing bus re-routing according to another embodiment of the present invention. Components in FIG. 14 that are similarly shown in FIG. 6 and/or other drawings will have the same or similar functionalities as described above and will not be repeated for purposes of brevity.

A CPU 1425 is coupled to and communicates with the arbiters 1408 and 1409 instead of an arbiter priority selected 625 of FIG. 6. In an embodiment of the invention, arbiters 1408 and 1409 can communicate with each other to a limited extent, and the CPU 1425 obtains information from the arbiters 1408 and 1409 and commands the arbiters 1308 and 1309 what to do, for example, during the process of arbitration in the event of re-routing. The CPU 1425 monitors the health, failure, and/or status of the buses 1411 and 1412 via the arbiters 1408 and 1409, respectively, via status signals 1422. The CPU 1425 also selects the priority between the bus 1411 and bus 1412 via priority signal 1421. The CPU 1425 performs the above functions by execution of firmware. Other operations during the event of re-routing between bus 1411 and bus 1412 (and other operations concerning bus 1411 and 1412) are similarly described above with reference to FIG. 6. However, the arbiters 1408 and 4309 includes additional intelligence because the arbiters 1408 and 1409 can send bus requests signals 1423 to each other and send bus grant signals 1424 to each other, as similarly described above with reference to FIG. 6.

Figure 15:
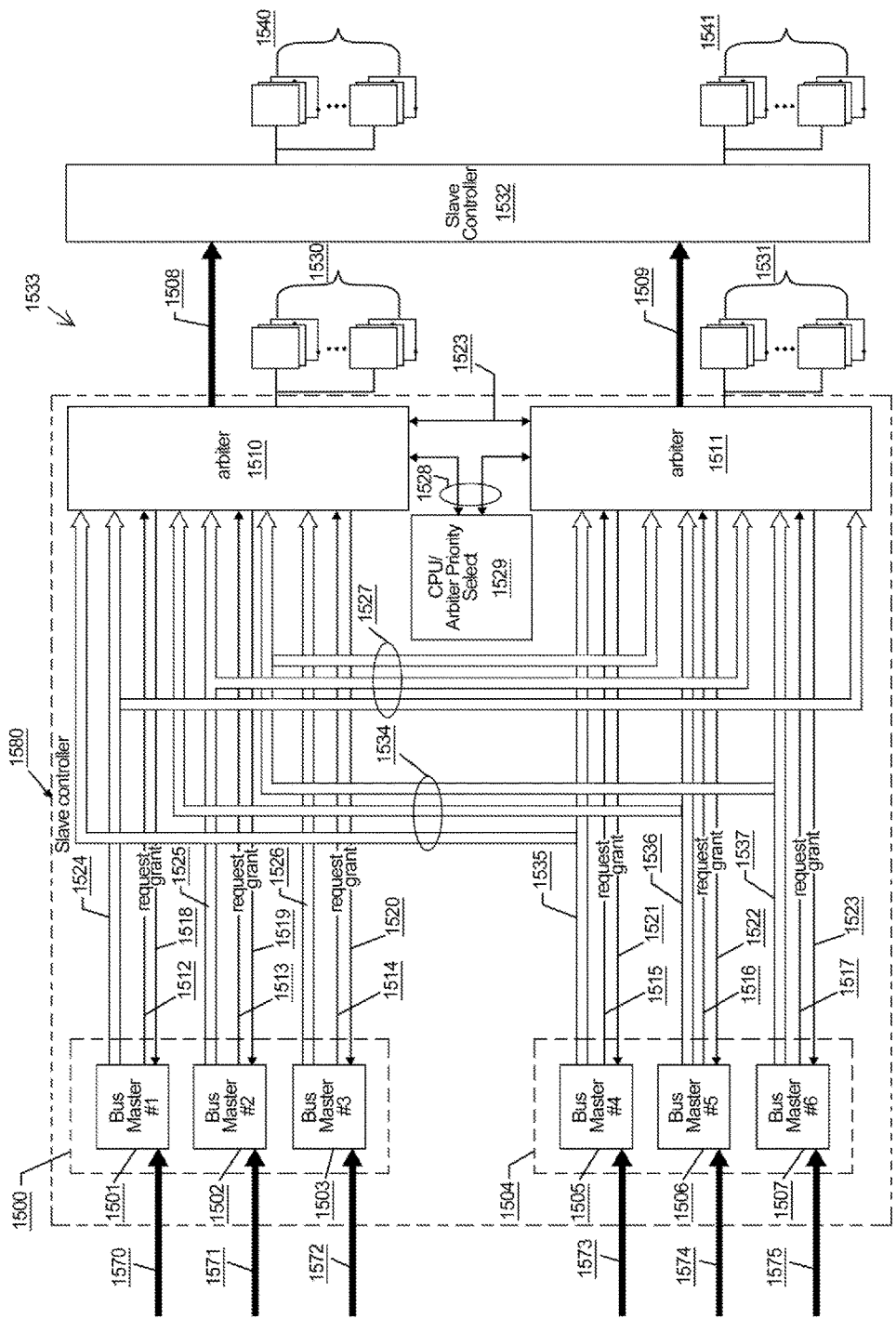
FIG. 15 is a diagram illustrating an example of a system performing bus re-routing according to another embodiment of the present invention.

FIG. 15 is a diagram illustrating an example of a system performing bus re-routing according to another embodiment of the present invention. FIG. 15 also shows additional details of a slave controller 1580 which can represent the details of the slave controller 1115 and 1122 in FIG. 11, in an embodiment of the invention.

Components in FIG. 15 that are similarly shown in FIG. 12 and/or other drawings will have the same or similar functionalities as described above and will not be repeated for purposes of brevity.

Ingress channels (e.g., flashbus) 1570, 1571, and 1572 are coupled to the bus masters 1501, 1502, and 1503, respectively, in set 1500, while ingress channels (e.g., flashbus) 1573, 1574, and 1575 are coupled to the bus masters 1505, 1506, and 1507, respectively, in set 1504. Egress channels (e.g., flashbus) 1508 and 1509 are coupled to the slave controller 1580 (via the arbiters 1510 and 1511, respectively) and are also coupled to the slave controller 1532. Similarly in FIG. 11, the ingress channels (e.g., flashbus) 1114, 1119, 1120, and/or 1121 are coupled to the slave controller 1115 and the egress channels (e.g., flashbus) 1126 are coupled to the slave controller 1115 and 1122.

FIG. 15 shows the operations of re-routing and/or failover that can be performed in serial Flashbus topology among slave controllers (e.g., slave controllers 1580 and 1532). The block 1529 communicates with the arbiter 1510 and arbiter 1511 and can be an arbiter priority select with functionalities as described above or a CPU with functionalities as described above. Therefore, by use of a CPU 1529 or an arbiter priority select 1529, the slave controller 1580 can decide re-routing or failover between the bus 1508 and 1509. As similarly described above, the communications between the arbiters 1510 and 1511 via the communication link 1523 is optional and may be an omitted function. The system or apparatus in FIG. 15 is also expandable in that an additional slave controller (or a plurality of slave controllers connected to each other in series) can be connected to the output ports of the slave controller 1532 and/or can be connected to the input ports of the slave controller 1580, and thus, the configuration of slave controllers in the system of FIG. 15 is expandable. Additionally, re-routing and/or failover between the bus 1508 and bus 1509 in a crisscross manner, as similarly described above, may be performed in the system of FIG. 15. Other operations during the event of re-routing and failover between bus 1508 and bus 1509 are similarly described above with reference to FIGS. 2 and 12.

In another embodiment of the invention, all of buses shown in FIG. 15 (e.g., 1570, 1571, 1572, 1573-1575), 1509, 1508 and all other buses shown in FIG. 15 are bi-directional buses. Circuit components and/or bus pairs may be used to make these buses transmit data in a bi-directional transmission.

The following features may be common components or concepts for all figures. An arbiter priority Select can also be a simple set of configuration registers with fixed or semi-fixed settings or a complex set of state machines or registers with fixed or semi-fixed setting. The values in the set of configuration registers determine the priority and/or failover operations between the bus 1508 and bus 1509. Hence multiple transactions may occur using these fixed settings. For example, if flashbus 1509 goes down or fails, an arbiter priority select 1520 can be set permanently to move all bus transactions to 1508 instead. The Arbiter Priority Select 1529 may or may not be set on-the-fly depending on the method of setting the arbiter Priority Select, and the time to failover to the surviving bus (bus 1508 in this example) and to shut down the failing bus (bus 1509 in this example) may depend on how fast the register setting in the arbiter priority select 1529 are reconfigured. Hence a delay amounting to multiple transaction durations may occur prior to the arbiter Priority Select being set.

Likewise, if the CPU 1520 takes the role of the Arbiter Priority Select, depending on the speed of the CPU, the algorithms within and the physical embodiment of communication link 1528, any updated settings may or may not be set on-the-fly. Hence a delay amounting to multiple transaction durations may occur prior to the CPU 1520 indicating the priority to the Arbiters 1510 and 1511.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
a plurality of bus masters comprising a first bus master, a second bus master, a third bus master, and a fourth bus master wherein the bus masters control slave devices and a plurality of bus arbiters configured to support failover, wherein the plurality of bus arbiters comprises a first bus arbiter coupled to the first bus master and the second bus master and a second bus arbiter coupled to the third bus master and fourth bus master;
wherein the first bus master is directly coupled by a first path to the first bus arbiter;
wherein the second bus master is directly coupled by a second path to the first bus arbiter;
wherein the third bus master is directly coupled by a third path to the second bus arbiter;
wherein the fourth bus master is directly coupled by a fourth path to the second bus arbiter; and
a central processing unit (CPU) coupled to the bus arbiters;
wherein the CPU is coupled by a link to the first bus arbiter and to the second bus arbiter;
wherein the CPU communicates with the first bus arbiter and the second bus arbiter;
wherein the slave devices comprise a first group of slave devices and a second group of slave devices;
wherein the first bus master and second bus master control the first group of slave devices; and
wherein the third bus master and fourth bus master control the second group of slave devices;
wherein the CPU is configured to execute the failover in response to a bus failure or in response to idle, inactive, or unused buses coupled to the second bus arbiter, wherein the failover comprises the second bus arbiter failing over to the first bus arbiter so that the first bus arbiter takes over a role of the second bus arbiter.

2. The apparatus of claim 1, further comprising:
a serial flashbus that connects the plurality of bus arbiters to a slave controller.

3. The apparatus of claim 2, wherein the slave controller is connected to at least one slave.

4. The apparatus of claim 1, further comprising:
a distributed bus that connects the plurality of bus arbiters to a slave controller.

5. The apparatus of claim 4, wherein the slave controller is connected to at least one slave.

6. The apparatus of claim 1, wherein the CPU obtains information from the plurality of bus arbiters and commands the plurality of bus arbiters during the failover.

7. The apparatus of claim 1, wherein the plurality of bus arbiters can send and receive bus request signals and bus grant signals.

8. The apparatus of claim 1, further comprising:
a slave controller coupled via a plurality of buses to the plurality of bus arbiters, wherein the slave controller is configured to choose failover between the plurality of buses.

9. A method, comprising:
choosing, by a central processing unit (CPU) coupled to a plurality of bus arbiters comprising a first bus arbiter and a second bus arbiter, a failover in response to a bus failure or in response to idle, inactive, or unused buses coupled to the second bus arbiter, wherein the failover comprises the second bus arbiter failing over to the first bus arbiter so that the first bus arbiter takes over a role of the second bus arbiter;
wherein a plurality of bus masters comprises a first bus master, a second bus master, a third bus master, and a fourth bus master wherein the bus masters control slave devices, wherein the plurality of bus arbiters comprises the first bus arbiter coupled to the first bus master and the second bus master and the second bus arbiter coupled to the third bus master and fourth bus master;
wherein the first bus master is directly coupled by a first path to the first bus arbiter;
wherein the second bus master is directly coupled by a second path to the first bus arbiter;
wherein the third bus master is directly coupled by a third path to the second bus arbiter;
wherein the fourth bus master is directly coupled by a fourth path to the second bus arbiter;
wherein the CPU is coupled by a link to the first bus arbiter and to the second bus arbiter; and
wherein the CPU communicates with the first bus arbiter and the second bus arbiter;
wherein the slave devices comprise a first group of slave devices and a second group of slave devices;
wherein the first bus master and second bus master control the first group of slave devices; and
wherein the third bus master and fourth bus master control the second group of slave devices.

10. The method of claim 9, wherein a serial flashbus connects a plurality of bus arbiters to a slave controller.

11. The method of claim 10, wherein the slave controller is connected to at least one slave.

12. The method of claim 9, wherein a distributed bus connects a plurality of bus arbiters to a slave controller.

13. The method of claim 12, wherein the slave controller is connected to at least one slave.

14. The method of claim 9, further comprising:
obtaining, by the CPU, information from the plurality of bus arbiters; and
commanding, by the CPU, the plurality of bus arbiters during failover.

15. The method of claim 9, further comprising:
sending and receiving, by the plurality of bus arbiters, bus request signals and bus grant signals.

16. The method of claim 9, further comprising:
choose, by a slave controller, failover between a plurality of buses.

17. An article of manufacture, comprising:
a non-transitory computer-readable medium having stored thereon instructions operable to permit an apparatus to perform a method comprising:
choosing, by a central processing unit (CPU) coupled to a plurality of bus arbiters comprising a first bus arbiter and a second bus arbiter, a failover in response to a bus failure or in response to idle, inactive, or unused buses coupled to the second bus arbiter, wherein the failover comprises the second bus arbiter failing over to the first bus arbiter so that the first bus arbiter takes over a role of the second bus arbiter;
wherein a plurality of bus masters comprises a first bus master, a second bus master, a third bus master, and a fourth bus master wherein the bus masters control slave devices, wherein the plurality of bus arbiters comprises the first bus arbiter coupled to the first bus master and the second bus master and the second bus arbiter coupled to the third bus master and fourth bus master;
wherein the first bus master is directly coupled by a first path to the first bus arbiter;
wherein the second bus master is directly coupled by a second path to the first bus arbiter;
wherein the third bus master is directly coupled by a third path to the second bus arbiter;
wherein the fourth bus master is directly coupled by a fourth path to the second bus arbiter;
wherein the CPU is coupled by a link to the first bus arbiter and to the second bus arbiter; and
wherein the CPU communicates with the first bus arbiter and the second bus arbiter;
wherein the slave devices comprise a first group of slave devices and a second group of slave devices;
wherein the first bus master and second bus master control the first group of slave devices; and
wherein the third bus master and fourth bus master control the second group of slave devices.

* * * * *